(12) United States Patent
Gerber et al.

(10) Patent No.: US 9,219,544 B2
(45) Date of Patent: Dec. 22, 2015

(54) LED BASED IDENTIFICATION AND COMMUNICATION SYSTEMS

(75) Inventors: Peter Gerber, Chur (CH); Jodi Lasky, Springfield, VA (US)

(73) Assignee: Analysis First LLC, Clifton, VA (US)

( * ) Notice: Subject to any disclaimer, the term of this patent is extended or adjusted under 35 U.S.C. 154(b) by 1077 days.

(21) Appl. No.: 13/174,028

(22) Filed: Jun. 30, 2011

(65) Prior Publication Data
US 2012/0001734 A1      Jan. 5, 2012

Related U.S. Application Data

(60) Provisional application No. 61/360,735, filed on Jul. 1, 2010.

(51) Int. Cl.
  *H04B 10/114* (2013.01)
  *F41G 3/26* (2006.01)

(52) U.S. Cl.
  CPC .......... *H04B 10/1143* (2013.01); *F41G 3/2655* (2013.01); *F41G 3/2683* (2013.01)

(58) Field of Classification Search
  CPC ... F41G 3/2655; F41G 3/2683; F41G 3/2622; F41A 33/02; F41J 5/02
  USPC ........................................................ 340/10.1
  See application file for complete search history.

(56) References Cited

U.S. PATENT DOCUMENTS

| | | | |
|---|---|---|---|
| 3,898,747 A * | 8/1975 | Marshall | .......................... 434/22 |
| 4,916,713 A | 4/1990 | Gerber | |
| 5,262,900 A | 11/1993 | Gerber | |
| 5,451,765 A | 9/1995 | Gerber | |
| 5,742,251 A | 4/1998 | Gerber | |
| 5,788,500 A | 8/1998 | Gerber | |
| 5,966,226 A | 10/1999 | Gerber | |

(Continued)

FOREIGN PATENT DOCUMENTS

| | | |
|---|---|---|
| GB | 2270602 A | 3/1994 |
| GB | 2290483 A | 1/1996 |

(Continued)

OTHER PUBLICATIONS

International Search Report of International Appl. No. PCT/US2011/042552 mailed on Oct. 18, 2011.

*Primary Examiner* — Omer S Khan
(74) *Attorney, Agent, or Firm* — Smith Moore Leatherwood LLP; John P. Zimmer; Matthew S. Bedsole

(57) ABSTRACT

In one aspect, identification and communication systems are described herein. In some embodiments, an identification and communication system comprises one or more query units and one or more response units, wherein at least one query unit comprises a query beam source comprising a light emitting diode (LED) operable to emit a query beam. In some embodiments, the query beam is substantially collimated. In some embodiments, an identification and communication system comprises one or more query units and one or more response units, wherein at least one query unit comprises a first query beam source operable to emit a first component beam and a second query beam source operable to emit a second component beam. In some embodiments, the first query beam source comprises an LED and the second query beam source comprises a laser. In some embodiments, the first component beam and the second component beam are substantially concentric.

7 Claims, 18 Drawing Sheets

(56) References Cited

U.S. PATENT DOCUMENTS

| | | |
|---|---|---|
| 6,174,169 B1 | 1/2001 | Gerber |
| 6,398,555 B1 | 6/2002 | Gerber et al. |
| 6,439,892 B1 | 8/2002 | Gerber |
| 6,450,816 B1 * | 9/2002 | Gerber .......................... 434/11 |
| 6,489,604 B1 * | 12/2002 | Fardin et al. .................. 250/216 |
| 6,914,518 B1 | 7/2005 | Gerber et al. |
| 7,068,699 B2 * | 6/2006 | Nettleton et al. ............... 372/92 |
| 7,831,150 B2 | 11/2010 | Roes et al. |
| 2002/0198994 A1 | 12/2002 | Patton et al. |
| 2003/0082501 A1 | 5/2003 | Varshneya |
| 2004/0076928 A1 * | 4/2004 | Renntoft .......................... 434/21 |
| 2007/0109807 A1 * | 5/2007 | Lynam et al. ................. 362/545 |
| 2008/0003543 A1 * | 1/2008 | Varshneya ....................... 434/21 |
| 2008/0020355 A1 * | 1/2008 | Young .............................. 434/21 |
| 2008/0292320 A1 | 11/2008 | Pederson |
| 2011/0171610 A1 * | 7/2011 | Preston et al. .................. 434/22 |

FOREIGN PATENT DOCUMENTS

| | | |
|---|---|---|
| WO | 02084201 A1 | 10/2002 |
| WO | 02103654 A2 | 12/2002 |

* cited by examiner

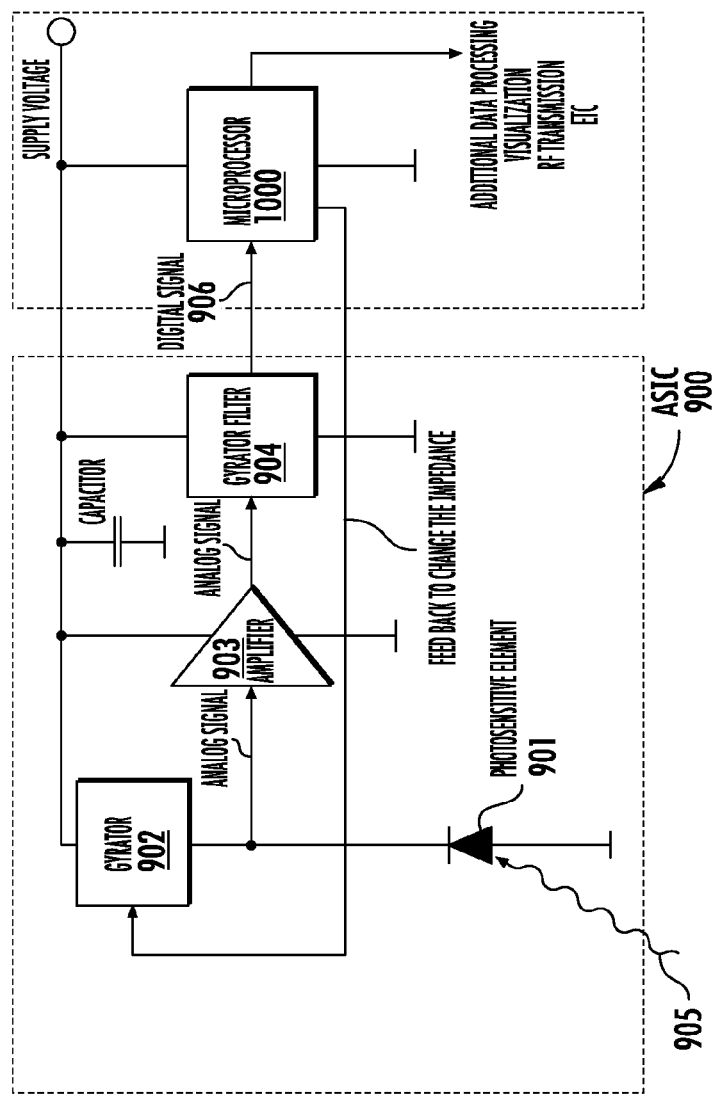
FIG. 5B
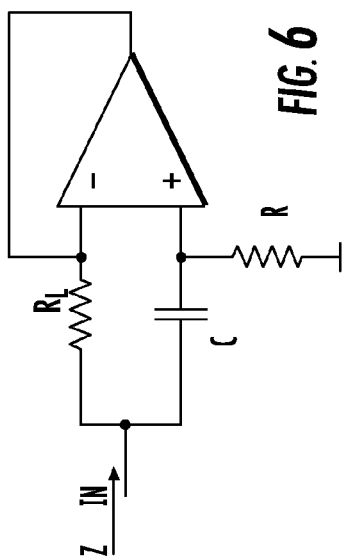
FIG. 6
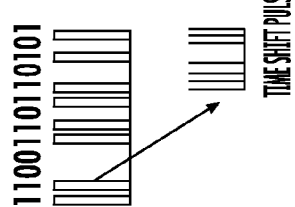

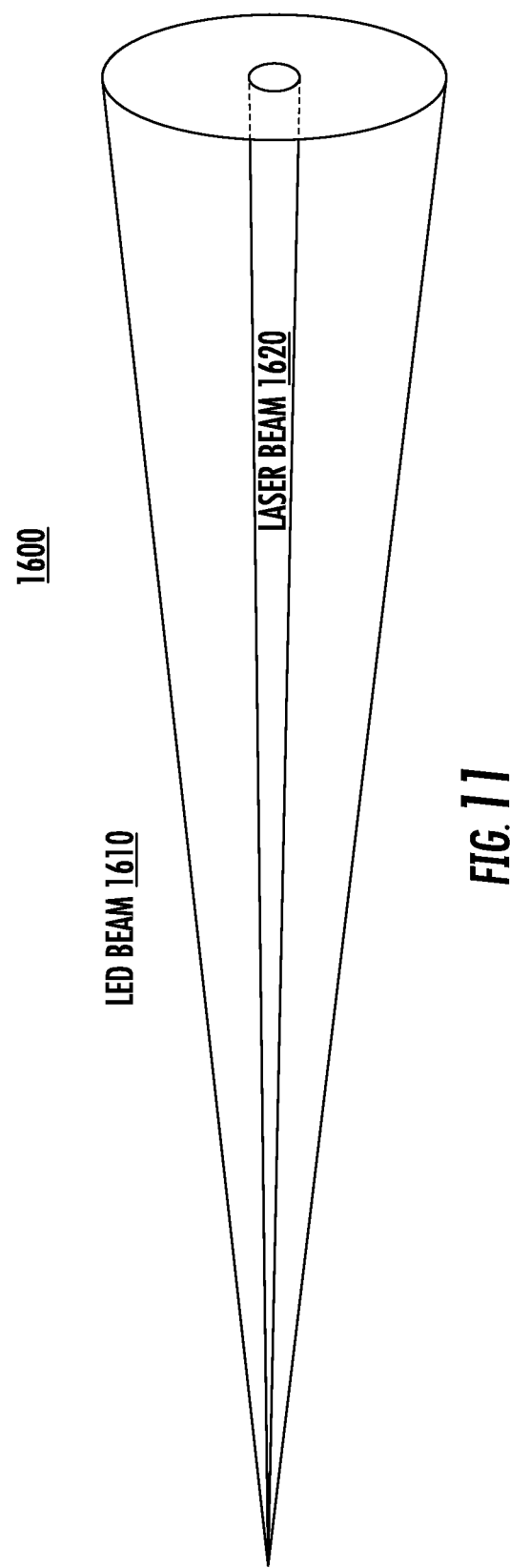

LED BASED IDENTIFICATION AND COMMUNICATION SYSTEMS

CROSS-REFERENCE TO RELATED APPLICATIONS

This application claims priority pursuant to 35 U.S.C, §119 (e) to U.S. Provisional Patent Application Ser. No. 61/360, 735, filed on Jul. 1, 2010, which is hereby incorporated by reference in its entirety.

FIELD OF THE INVENTION

The present invention relates to identification and communication systems; methods of using identification and communication systems in combat, training, emergency, and other situations; and methods of simulating combat.

BACKGROUND

Identification and communication systems can be used in a variety of applications, including military combat and training. Combat and training situations can present many challenges to rapid, safe, and reliable identification of people and objects. Therefore, improved identification and communication systems are desired.

SUMMARY

In one aspect, identification and communication systems are described herein. An identification and communication system described herein, in some embodiments, comprises one or more query units and one or more response units, wherein at least one query unit is operable to emit a query beam and at least one response unit comprises at least one detector comprising an application specific integrated circuit (ASIC) comprising an amplifier operable to amplify the query beam. In some embodiments, the query beam is coded and the ASIC further comprises one or more of a filter, demodulator, and validator operable, respectively, to filter, decode, and validate the coded query beam. In some embodiments, the ASIC is electromagnetically shielded.

An identification and communication system described herein, in some embodiments, comprises one or more query units and one or more response units, wherein at least one response unit comprises at least one detector capable of detecting incident radiation having a power of about 100 pW or less. In some embodiments of communication and identification systems described herein comprising one or more detectors, at least one detector comprises a dedicated power supply.

An identification and communication system described herein, in some embodiments, comprises one or more query units and one or more response units, wherein at least one response unit comprises one or more detectors comprising one or more optical fibers operable to direct one or more signals received from at least one query unit to the one or more detectors. In some embodiments, at least one optical fiber is operable to receive a signal from at least one query unit through the side of the optical fiber. In some embodiments, at least one optical fiber comprises a fluorescent plastic fiber (FPF). In some embodiments, at least one optical fiber is disposed in a textile. In some embodiments, the textile comprises a garment.

An identification and communication system described herein, in some embodiments, comprises one or more query units and one or more response units, wherein at least one query unit comprises a query beam source comprising a light emitting diode (LED) operable to emit a query beam. In some embodiments, the query beam is substantially collimated.

An identification and communication system described herein, in some embodiments, comprises one or more query units and one or more response units, wherein at least one query unit is operable to emit a composite query beam comprising a first component beam and a second component beam. In some embodiments, an identification and communication system comprises one or more query units and one or more response units, wherein at least one query unit comprises a first query beam source operable to emit a first component beam and a second query beam source operable to emit a second component beam. In some embodiments, the first query beam source comprises an LED and the second query beam source comprises a laser. In some embodiments, the first component beam is substantially collimated and the second component beam is substantially collimated. In some embodiments, the first component beam has a higher divergence than the second component beam. In some embodiments, the first component beam has a larger diameter than the second component beam. In some embodiments, the first component beam and the second component beam are substantially concentric. In some embodiments, the system further comprises a beam splitter.

An identification and communication system described herein, in some embodiments, comprises one or more query units and one or more response units, wherein at least one query unit is a handheld device. In some embodiments, the handheld device does not comprise a weapon and is not mounted on a weapon. In some embodiments, the handheld device comprises a flashlight. In some embodiments, the handheld device comprises a stylus. In some embodiments, the handheld device comprises a smart device in communication with the stylus. In some embodiments of systems described herein wherein at least one query unit is a handheld device, the handheld device comprises a display screen. In some embodiments, the handheld device comprises a query controller and the display screen is operable to display data provided by the query controller.

An identification and communication system described herein, in some embodiments, comprises at least one query unit having one or more components and at least one response unit having one or more components, wherein at least one component of at least one query unit is disposed in a first housing and at least one component of at least one response unit is disposed in a second housing. In some embodiments, an identification and communication system comprises at least one component of a response unit disposed in a first housing mounted to a weapon and at least one component of a query unit disposed in a second housing mounted to the weapon. In some embodiments, the weapon comprises an eyepiece and the first housing is mounted to the weapon near the balance point of the weapon and the second housing is mounted to the weapon in front of and below the eyepiece.

In another aspect, methods of identifying and communicating are described herein. In some embodiments, a method of identifying and communicating comprises emitting a query beam from a query unit described herein, receiving the query beam with a response unit described herein, emitting a response beam described herein from the response unit, and receiving the response beam with the query unit. In some embodiments, the query beam conveys information to the response unit. In some embodiments, the response beam conveys information to the query unit.

In another aspect, methods of simulating combat are described herein. In some embodiments, a method of simulating combat comprises emitting a query beam from a query unit described herein, receiving the query beam with a response unit described herein, emitting a response beam described herein from the response unit, and receiving the response beam with the query unit. In some embodiments, the query beam conveys information to the response unit. In some embodiments, the response beam conveys information to the query unit. In some embodiments, a method of simulating combat described herein comprises emitting a first query beam from a first query unit of a first interoperable identification and communication system, receiving the first query beam with a second response unit of a second interoperable identification and communication system, emitting a second response beam with the second response unit, and receiving the second response beam with the first query unit. In some embodiments, the method further comprises emitting a second query beam from a second query unit of the second interoperable identification and communication system, receiving the second query beam with a first response unit of the first interoperable identification and communication system, emitting a first response beam with the first response unit, and receiving the first response beam with the second query unit. In some embodiments, the first query beam comprises a pulsed laser beam and the second query beam comprises a continuous wave (CW) laser beam. In some embodiments, the first query beam comprises at least one pulse and the second query beam comprises at least one pulse. In some embodiments, the first query beam comprises at least one pulse having a pulse length and a power per pulse whose product is within about 50% of the product of the pulse length and power per pulse of at least one pulse of the second query beam. In some embodiments, the first query beam comprises at least one pulse having a pulse length of about 65 µs per pulse to about 75 µs per pulse and a power of about 1.8 W per pulse to about 2.2 W per pulse and the second query beam comprises at least one pulse having a pulse length of about 0.9 ms per pulse to about 1.1 ms per pulse and a power of about 90 mW per pulse to about 110 mW per pulse.

In some embodiments, a method of simulating combat comprises emitting a query beam comprising a plurality of packets each comprising a header portion, an information portion, and a footer portion from a query unit; and receiving the query beam with a response unit comprising a plurality of detectors spatially separated from one another, wherein the response unit is operable to independently measure the intensity of each packet of the query beam received at each of the plurality of detectors. In some embodiments, each information portion is the same, each header portion is different, and each footer portion is different. In some embodiments, the method further comprises measuring the intensity of each packet of the query beam received at each detector and processing the measured intensities.

BRIEF DESCRIPTION OF THE DRAWINGS

FIG. 5B illustrates some components of a response unit according to some embodiments described herein.

FIG. 6 illustrates a component of a response unit according to some embodiments described herein.

FIG. 11 illustrates a composite query beam according to an embodiment described herein.

DETAILED DESCRIPTION

Figure 1:
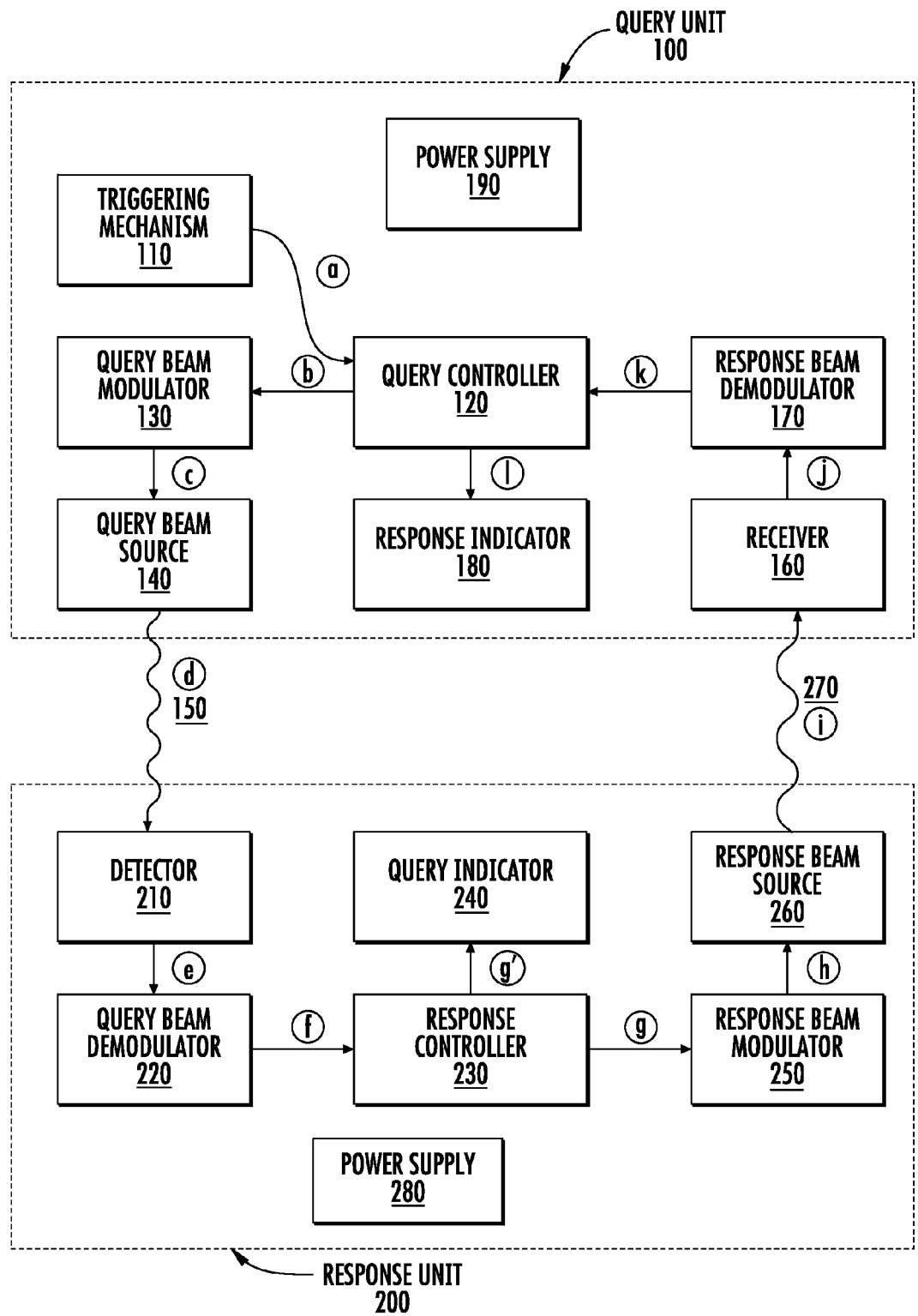
FIG. 1 illustrates some components of an identification and communication system according to some embodiments described herein.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Some embodiments described herein can be understood more readily by reference to the following detailed description, drawings, and examples. Elements, apparatus, and methods described herein, however, are not limited to the specific embodiments presented in the detailed description, drawings, and examples. It should be recognized that these embodiments are merely illustrative of the principles of the present invention. Numerous modifications and adaptations will be readily apparent to those of skill in the art without departing from the spirit and scope of the invention.

I. Identification and Communication Systems

A. General Features

In one aspect, identification and communication systems are described herein. An identification and communication system described herein, in some embodiments, can be used for the Identification of Friend or Foe (IFF) in military training or combat or in other emergency situations where rapid and reliable identification of others is needed (e.g., involving police, firefighters, or medical personnel). In some embodiments, an identification and communication system described herein comprises one or more query units and one or more response units. In some embodiments, at least one query unit of an identification and communication system described herein sends a coded (i.e., modulated) query beam or signal to a target. The encoding or modulation of a beam, in some embodiments, permits information to be transmitted by the beam securely. If the target comprises a response unit of the system, then the response unit can, in some embodiments, receive the query beam.

In some embodiments, a query beam is received by the response unit using a detector comprising at least one photosensitive element. In some embodiments, the query beam strikes at least a portion of a photosensitive element, generating one or more charge carriers, such as electrons, holes, or electron-hole pairs. The charge carriers, in some embodiments, are then extracted from the photosensitive element using methods known in the art, generating an electrical signal (such as a voltage or current). The electrical signal, in some embodiments, can be transmitted and/or manipulated using methods known in the art.

In some embodiments, the response unit can receive a query beam and then emit a response beam which can be received by the query unit. In some embodiments, the response beam is received by the query unit in a manner similar to that described above regarding the receipt of a query beam by the response unit. In some embodiments, the response beam is received by the query unit using a radio frequency receiver. In some embodiments, the radio frequency receiver comprises an antenna.

In some embodiments, the response beam is modulated (i.e., coded). The response beam, in some embodiments, is adapted to convey information to the query unit, such as that the target is a "friend." In some embodiments, if the target does not comprise a response unit of the identification and communication system, the query unit will not receive a response beam, implying, for example, that the target is not a "friend."

In some embodiments, the response beam is adapted to convey information (data) to the query unit in addition to whether the target is a "friend." In some embodiments, the information comprises one or more of the identity of the user of the response unit, the type of response unit (e.g., a response unit associated with a vehicle, a particular type of handheld weapon, a particular type or group of personnel (e.g., a SWAT team or infantry company), or an object such as an explosive device or a box or crate of provisions or other payload), and the location of the response unit (e.g., the global positioning system or "GPS" coordinates of the response unit). In some embodiments, the information comprises situational information such as whether the user of the response unit requires assistance, the amount of ammunition or supplies in the possession of the user of the response unit, the number of other objects or personnel that are present with the user of the response unit (e.g., the number of other soldiers present in the user's group), whether the user of the response unit is in contact with an enemy, or whether the user of the response unit has been captured. In some embodiments, the response unit comprises a data entry device, such as a keyboard or microphone in communication with a computer, operable to enter information to be encoded in one or more response beams.

In some embodiments, the query beam can provide information to the response unit, such as one or more of the desired frequency or encoding to use for the response beam, the identity of the user of the query unit, the type of query unit (e.g., a query unit associated with a vehicle, a particular type of handheld weapon, or a particular type or group of personnel), and the location of the query unit (e.g., the GPS coordinates of the query unit). In some embodiments, the query beam provides instructions to the response unit. In some embodiments, for example, the information or instructions comprise an alarm signal, instructions for the user of the response unit to move to a certain location (e.g., return to his unit), notification that the user of the query unit is in contact with an enemy or requires assistance, or notification of the amount of ammunition or supplies in the possession of the user of the query unit. In some embodiments, the information comprises image or voice data. In some embodiments, the query unit comprises a data entry device, such as a keyboard or microphone in communication with a computer, operable to enter information to be encoded in one or more query beams.

An identification and communication system described herein, in some embodiments, can also be used for other military and civilian identification and communication applications where rapid, reliable, and secure identification, communication, and information transfer is needed. In some embodiments, for example, an identification and communication system described herein can be used for live military training exercises simulating combat. In some embodiments, a query unit of an identification and communication system described herein, for example, can be mounted to a weapon or other device, and a response unit described herein can be attached to a target. In some embodiments, an identification and communication system described herein can further comprise one or more recording and/or feedback mechanisms (such as a circuit, processor, or computer) used to record weapon activity and results.

One embodiment of an identification and communication system described herein is illustrated schematically in FIG. 1. With reference to FIG. 1, an identification and communication system described herein, in some embodiments, comprises at least one query unit 100 and at least one response unit 200. The query unit, in some embodiments, can be any query unit not inconsistent with the objectives of the present invention. In some embodiments, the query unit comprises one or more components. In some embodiments, query unit 100 comprises one or more of a triggering mechanism 110, a query controller 120, a query beam modulator 130, a query beam source 140, a receiver 160, a response beam demodulator 170, a response indicator 180, and a power supply 190. The response unit, in some embodiments, can be any response unit not inconsistent with the objectives of the present invention. In some embodiments, the response unit comprises one or more components. In some embodiments, response unit 200 comprises one or more of a detector 210, a query beam demodulator 220, a response controller 230, a query indicator 240, a response beam modulator 250, a response beam source 260, and a power supply 280.

The query unit, in some embodiments, is operable to transmit a modulated (i.e., coded) query beam 150 providing information and/or instructions to the response unit. In some embodiments, the query unit is operable to transmit and the response unit is operable to receive a query beam on up to 32 different channels. In some embodiments, the query unit is operable to transmit and the response unit is operable to receive a query beam on more than 32 different channels, such as up to 64 channels or up to 128 channels. The response unit, in some embodiments, is operable to transmit a coded or uncoded response beam 270 providing information to the query unit. In some embodiments, the response unit is operable to transmit and the query unit is operable to receive a response beam on up to 32 different channels. In some embodiments, the response unit is operable to transmit and the query unit is operable to receive a response beam on more than 32 different channels, such as up to 64 channels or up to 128 channels.

In some embodiments, triggering mechanism 110 is operable to activate and deactivate the query beam source by sending a signal (a in FIG. 1) to query controller 120, which is operable to send a signal (b) to query beam modulator 130 instructing query beam modulator 130 to send a signal (c) to query beam source 140 operable to generate a coded query beam 150, for example by pulsing the output of query beam source 140. In some embodiments, coded query beam 150 can be received and demodulated (i.e., decoded), respectively, by detector 210 and query beam demodulator 220. In some embodiments, detector 210 can receive coded query beam 150 by extracting one or more charge carriers generated in a photosensitive element (not shown) by coded query beam 150 to generate a coded electrical signal (not shown). Query beam demodulator 220, in some embodiments, can decode the signal thus generated (e) by coded query beam 150 to extract encoded information or instructions. In some embodiments, query beam demodulator 220 can then send a signal (f) to response controller 230, which, in some embodiments, can process the signal, including any information or instructions the signal contains, and send a signal (g or g prime) to one or both of query indicator 240 and response beam modulator 250. The signal from response controller 230 can, for example, instruct query indicator 240 to indicate that a query was received and/or instruct response beam modulator 250 to send a signal (h) to response beam source 260 operable to generate a modulated (i.e., coded) response beam or signal 270. In some embodiments, receiver 160 and response beam demodulator 170 are operable to receive and demodulate (i.e., decode), respectively, coded response beam 270 in a similar manner as above. In some embodiments, response beam demodulator 170 is operable to then send a signal (k) to query controller 120, which in some embodiments can send a signal (I) to response indicator 180, instructing response indicator 180, for example, to indicate that a response was received.

With reference to FIG. 1, some embodiments of identification and communication systems described herein comprise one or more query beam sources 140. One or more query beam source can comprise any query beam source not inconsistent with the objectives of the present invention. In some embodiments, a query beam source comprises a source of electromagnetic radiation. In some embodiments, a query beam source comprises a laser. In some embodiments, a query beam source comprises a pulsed wave laser. In some embodiments, a query beam source comprises a continuous wave (CW) laser. In some embodiments, a query beam source comprises a laser having a Class I power output rating according to ANSI Laser Safety Standard ANSI Z136.1. In some embodiments, a query beam source comprises a diode laser. In some embodiments, a query beam source comprises a GaAs diode laser.

In some embodiments, a query beam source comprises a light emitting diode (LED). Any suitable LED not incompatible with the objectives of the present invention may be used. In some embodiments, the LED is a 1-W LED. In some embodiments, the LED is a 10-W LED. In some embodiments, the LED is a 1- to 10-W LED. In some embodiments, the LED has a diameter of about 5 mm or less. In some embodiments, the LED has a diameter of about 1 mm or less. In some embodiments, the LED comprises gallium arsenide (GaAs). In some embodiments, the LED comprises aluminum gallium arsenide ($Al_xGa_{1-x}As$). In some embodiments, the query beam source comprises a plurality of LEDs. In some embodiments, the plurality of LEDs comprises one or more arrays of LEDs described herein.

A query beam source described herein, in some embodiments, can provide electromagnetic radiation having various wavelengths. In some embodiments, a query beam source provides visible electromagnetic radiation. In some embodiments, a query beam source provides near infrared electromagnetic radiation. In some embodiments, a query beam source provides infrared electromagnetic radiation. In some embodiments, a query beam source provides radiation having a wavelength between about 750 nm and about 950 nm. In some embodiments, a query beam source provides radiation having a wavelength between about 780 nm and about 920 nm or between about 820 nm and about 880 nm. In some embodiments, a query beam source provides radiation having a wavelength of about 850 nm. In some embodiments, a query beam source provides radiation having a wavelength between about 0.8 μm and about 2.2 μm, between about 1.0 μm and about 2.0 μm, or between about 1.2 μm and about 1.8 μm. In some embodiments, a query beam source provides radiation having a wavelength of about 1.5 μm.

A query beam source described herein, in some embodiments, can have various power outputs. In some embodiments, a query beam source has a power output of about 1 mW to about 2 W. In some embodiments, a query beam source has a power output of about 50 mW to about 150 mW, about 20 mW to about 80 mW, or about 40 mW to about 60 mW. In some embodiments, a query beam source has a power output of about 50 mW. In some embodiments, a query beam source has a power output of about 100 mW.

A query beam source described herein, in some embodiments, can emit a query beam having various divergences. In some embodiments, a query beam has a divergence of less than about 1.0 milliradian (mrad), where 1 mrad corresponds to a beam diameter of 1 mm at a distance of 1,000 mm. In some embodiments, the divergence is less than about 0.5 mrad. In some embodiments, the divergence is between about 0.1 mrad and about 0.5 mrad. In some embodiments, the divergence is between about 0.1 mrad and about 2 mrad. In some embodiments, a query beam has a divergence corresponding to a beam diameter or spot size of about 5 cm at 100 m. In some embodiments, the divergence is between about 10 mrad and about 500 mrad. In some embodiments, a query beam source provides a query beam having a tunable divergence. In some embodiments, a query beam has a divergence tunable from about 0.1 mrad to about 10.0 mrad. In some embodiments, a query beam has a divergence tunable from about 0.5 mrad to about 10.0 mrad. In some embodiments, a query beam has a divergence tunable from about 0.5 mrad to about 5.0 mrad. In some embodiments, a query beam has a divergence tunable from about 10 mrad to about 500 mrad.

With reference to FIG. 1, some embodiments of identification and communication systems described herein comprise a query beam modulator 130. A query beam modulator can comprise any modulator not inconsistent with the objectives of the present invention. In some embodiments, a modulator comprises a circuit. In some embodiments, a modulator comprises a processor. In some embodiments, a modulator comprises a computer. In some embodiments, a modulator is operable to pulse the query beam. In some embodiments, a modulator is operable to time-shift the query beam. In some embodiments, a modulator is operable to shape the query beam. In some embodiments, a modulator is operable to perform one or more of amplitude, frequency, and pulse modulation. In some embodiments, a modulator is operable to perform one or more of pulse position modulation (PPM)

and pulse code modulation (PCM). In some embodiments, a modulator is operable to create data packages from about 4 bits to about 400 bits long.

With reference to FIG. 1, some embodiments of identification and communication systems described herein comprise a modulated or coded query beam or signal 150. The coded query beam can comprise any coded beam not inconsistent with the objectives of the present invention. In some embodiments, a coded beam comprises a pulsed beam. In some embodiments, a coded beam comprises a series of 1-microsecond pulses. In some embodiments, a coded beam comprises a pulse packet from about 15 ms to about 20 ms long. In some embodiments, a coded beam comprises one or more 116-bit words modulated at 10 MHz. In some embodiments, a pulsed query beam has a pulse width between about 10 ns and about 100 ms. In some embodiments, a pulsed query beam has a pulse width between about 0.5 ms and about 1.5 ms. In some embodiments, the information bit pulses of a pulsed query beam correspond to the width of between about 3 and about 50 chopped laser pulses.

With reference to FIG. 1, some embodiments of identification and communication systems described herein comprise a triggering mechanism 110. The triggering mechanism can comprise any triggering mechanism not inconsistent with the objectives of the present invention. In some embodiments, the triggering mechanism comprises a piezoelectric component. In some embodiments, the piezoelectric component is associated with a mechanical trigger and a circuit. In some embodiments, the triggering mechanism comprises a microswitch. In some embodiments, the microswitch is associated with a push button or slide switch and a circuit. In some embodiments, the triggering mechanism comprises one or more of a push button and a slide switch.

With reference to FIG. 1, some embodiments of identification and communication systems described herein comprise a receiver 160 for receiving a response beam or signal 270. The receiver can comprise any receiver not inconsistent with the objectives of the present invention. In some embodiments, the receiver comprises a radio receiver. In some embodiments, the radio receiver comprises an antenna. In some embodiments, the receiver comprises a universal mobile telecommunications system (UMTS) receiver. In some embodiments, the receiver comprises a general packet radio service (GPRS) receiver.

With reference to FIG. 1, some embodiments of identification and communication systems described herein comprise a response beam demodulator 170. The response beam demodulator can comprise any demodulator not inconsistent with the objectives of the present invention. In some embodiments, the demodulator comprises a circuit. In some embodiments, the demodulator comprises a processor. In some embodiments, the demodulator comprises a computer. In some embodiments, the demodulator is operable to extract data from a modulated response beam. In some embodiments, the demodulator comprises one or more of an FM demodulator, a PM demodulator, an envelope detector, a quadrature or quadrant detector, a phase locked loop, a Foster-Seeley discriminator, a ratio detector, a pulse code demodulator, and a time shift demodulator.

With reference to FIG. 1, some embodiments of identification and communication systems described herein comprise a query controller 120. The query controller can comprise any controller not inconsistent with the objectives of the present invention. In some embodiments, the query controller comprises a circuit. In some embodiments, the query controller comprises a processor. In some embodiments, the query controller comprises a computer. In some embodiments, the query controller is operable to process signals and information contained in signals received from one or more other system components. In some embodiments, processing a signal comprises using the signal as an input to one or more algorithms. In some embodiments, processing a first signal comprises using the first signal as an input to one or more algorithms and thereby generating at least one second signal. In some embodiments, processing comprises sending at least one second signal to one or more other system components.

With reference to FIG. 1, some embodiments of identification and communication systems described herein comprise a response indicator 180. The response indicator can comprise any indicator not inconsistent with the objectives of the present invention. In some embodiments, the response indicator is adapted to indicate to a user of a query unit whether a signal has been received from a response unit. In some embodiments, the response indicator comprises a light. In some embodiments, the light is adapted to blink when a signal is received from a response unit. In some embodiments, the response indicator comprises a sound device. In some embodiments, the sound device is adapted to produce a sound when a signal is received from a response unit. In some embodiments, the response indicator comprises a vibrating device. In some embodiments, the vibrating device is adapted to vibrate when a signal is received from a response unit.

With reference to FIG. 1, some embodiments of identification and communication systems described herein comprise a detector 210. The detector can comprise any detector not inconsistent with the objectives of the present invention. In some embodiments, the detector is adapted to receive and respond to only a query beam described herein. In some embodiments, the detector is adapted to receive and respond to only a coded query beam described herein. In some embodiments, the detector is adapted to respond to only a query beam described herein using components and methods known in the art, such as filters and filtering. In some embodiments, the detector comprises a PIN photodiode. In some embodiments, the detector comprises one or more of silicon (Si), germanium (Ge), gallium (Ga), gallium arsenide (GaAs), indium arsenide (InAs), and indium gallium arsenide ($InGa_xAs_{1-x}$). In some embodiments, the detector is shaped like a disc. In some embodiments, the detector is less than about 5 cm wide. In some embodiments, the detector is less than about 3 cm wide. In some embodiments, the detector is less than about 2 cm tall. In some embodiments, the detector is less than about 1 cm tall. In some embodiments, the detector is less than about 3 cm wide and less than about 1 cm tall.

With reference to FIG. 1, some embodiments of identification and communication systems described herein comprise a response beam source 260. The response beam source can comprise any response beam source not inconsistent with the objectives of the present invention. In some embodiments, the response beam source comprises a source of electromagnetic radiation. In some embodiments, the response beam source comprises a source of radio frequency electromagnetic radiation. In some embodiments, the response beam source comprises a radio transmitter. In some embodiments, the response beam source comprises a laser. In some embodiments, the response beam source comprises a light emitting diode (LED).

With reference to FIG. 1, some embodiments of identification and communication systems described herein comprise a response beam modulator 250. The response beam modulator can comprise any modulator not inconsistent with the objectives of the present invention. In some embodiments, the modulator comprises a circuit. In some embodiments, the modulator comprises a processor. In some embodiments, the modulator comprises a computer. In some embodiments, the modulator is operable to pulse the response beam. In some embodiments, the modulator is operable to time-shift the response beam. In some embodiments, the modulator is operable to shape the response beam. In some embodiments, the modulator is operable to perform one or more of amplitude, frequency, and pulse modulation. In some embodiments, the modulator is operable to perform one or more of pulse position modulation (PPM) and pulse code modulation (PCM). In some embodiments, the modulator is operable to create data packages from about 4 bits to about 400 bits long.

With reference to FIG. 1, some embodiments of identification and communication systems described herein comprise a query beam demodulator 220. The query beam demodulator can comprise any demodulator not inconsistent with the objectives of the present invention. In some embodiments, the demodulator comprises a circuit. In some embodiments, the demodulator comprises a processor. In some embodiments, the demodulator comprises a computer. In some embodiments, the demodulator is operable to extract data from a modulated query beam. In some embodiments, the demodulator comprises one or more of an FM demodulator, a PM demodulator, an envelope detector, a quadrature or quadrant detector, a phase locked loop, a Foster-Seeley discriminator, a ratio detector, a pulse code demodulator, and a time shift demodulator.

With reference to FIG. 1, some embodiments of identification and communication systems described herein comprise a response controller 230. The response controller can comprise any controller not inconsistent with the objectives of the present invention. In some embodiments, the response controller comprises a circuit. In some embodiments, the response controller comprises a processor. In some embodiments, the response controller comprises a computer. In some embodiments, the response controller is operable to process signals and information contained in signals received from one or more other system components. In some embodiments, the response controller is operable to process signals and information contained in signals received from a plurality of detectors described herein. In some embodiments, the response controller is operable to process signals and information received from up to about 40 detectors. In some embodiments, processing a signal comprises using the signal as an input to one or more algorithms. In some embodiments, processing a first signal comprises using the first signal as an input to one or more algorithms and thereby generating at least one second signal. In some embodiments, processing comprises sending at least one second signal to one or more other system components.

With reference to FIG. 1, some embodiments of identification and communication systems described herein comprise a query indicator 240. The query indicator can comprise any indicator not inconsistent with the objectives of the present invention. In some embodiments, the query indicator is adapted to indicate to a user of a response unit that a signal has been received from a query unit. In some embodiments, the query indicator comprises a light. In some embodiments, the light is adapted to blink when a signal is received from a query unit. In some embodiments, the query indicator comprises a sound device. In some embodiments, the sound device is adapted to produce a sound when a signal is received from a query unit. In some embodiments, the query indicator comprises a vibrating device. In some embodiments, the vibrating device is adapted to vibrate when a signal is received from a query unit.

Some embodiments of identification and communication systems described herein comprise one or more circuits. One or more circuits can comprise any circuit not inconsistent with the objectives of the present invention. In some embodiments, a circuit comprises an integrated circuit. Some embodiments of identification and communication systems described herein comprise one or more processors. One or more processors can comprise any processor not inconsistent with the objectives of the present invention. In some embodiments, a processor comprises a microprocessor. Some embodiments of identification and communication systems described herein comprise one or more computers. One or more computers can comprise any computer not inconsistent with the objectives of the present invention. In some embodiments, a computer comprises one or more forms of memory for data storage, at least one element that carries out arithmetic and logic operations, and a sequencing and control element that can change the order of operations based on one or more parameters, such as stored information. In some embodiments, a computer comprises a central processing unit (CPU) and a portioned memory system. A computer, in some embodiments, is operable to store and execute a computer program product. In some embodiments, a computer is about the same size as a small cell phone or MP3 player. In some embodiments, a computer is about 5 cm or less wide, about 10 cm or less long, and about 2 cm or less thick.

Some embodiments of identification and communication systems described herein comprise one or more power supplies. One or more power supply can comprise any power supply not inconsistent with the objectives of the present invention. In some embodiments, a power supply comprises one or more batteries. In some embodiments, a battery comprises an alkaline battery. In some embodiments, the alkaline battery is a AA alkaline battery. In some embodiments, a battery comprises a lithium ion battery. In some embodiments, a battery comprises a lithium battery. In some embodiments, a battery comprises a nickel-metal hydride (NiMH) battery. In some embodiments, a power supply comprises a solar cell.

Various components of identification and communication systems described herein, in some embodiments, can be connected by methods known in the art, such as through conventional wiring. Similarly, signals sent and received to and from various components of identification and communication systems described herein, in some embodiments, can be sent and received by any method not inconsistent with the objectives of the present invention, including methods known in the art. As understood by those of ordinary skill in the art, in some embodiments, signals comprise electronic signals. In some embodiments, signals comprise optical signals.

Figure 2:
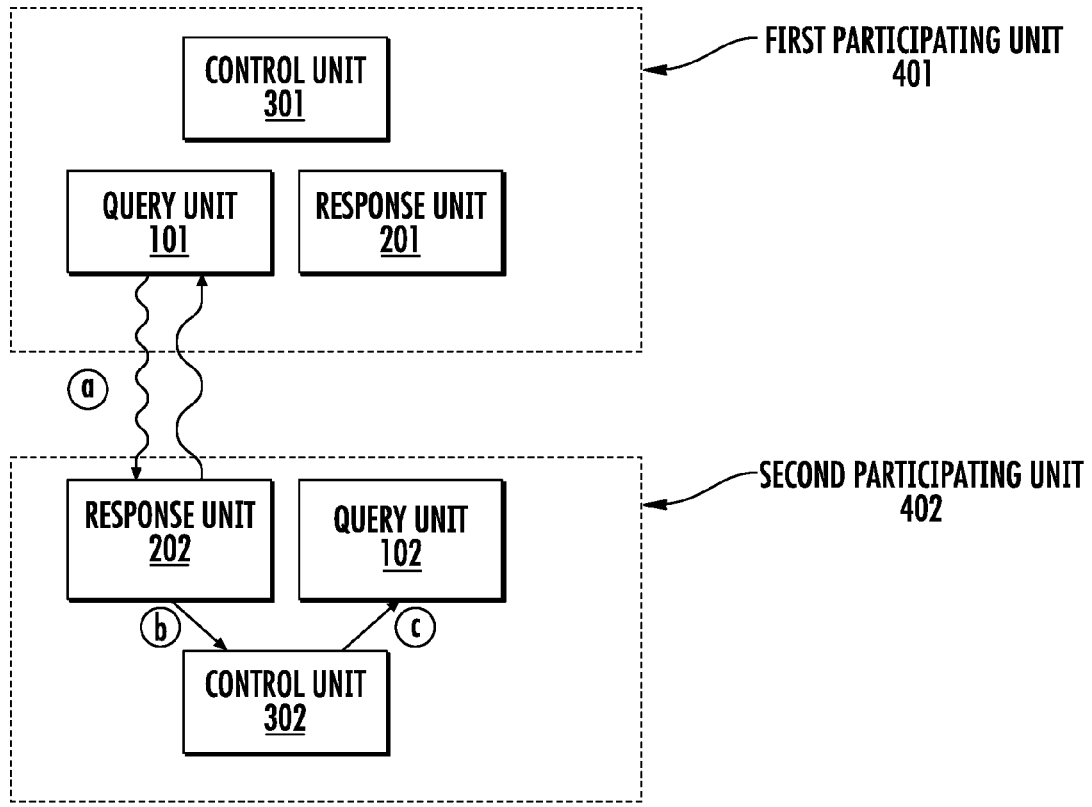
FIG. 2 illustrates some components of an identification and communication system according to some embodiments described herein.

Some embodiments of identification and communication systems described herein comprise one or more features especially suitable for use in military training and combat simulation. For example, as illustrated schematically in FIG. 2, some embodiments of identification and communication systems described herein comprise one or more participating units. Any participating unit not inconsistent with the objectives of the present invention may be used. In some embodiments, the participating unit comprises an individual soldier or first responder. In some embodiments, the participating unit comprises an individual vehicle or individual object. In some embodiments, at least one participating unit comprises a query unit, a response unit, and a control unit. In some embodiments, a first participating unit 401 comprises a first query unit 101, a first response unit 201, and a first control unit 301. In some embodiments, a second participating unit 402 comprises a second query unit 102, a second response unit 202, and a second control unit 302. In some embodiments, each query unit and each response unit can interact (e.g., by sending and receiving signals) independently with one or more other response units or query units. For example, in some embodiments, first query unit 101 can interact with second response unit 202 (a in FIG. 2), and second query unit 201 can interact with a third response unit (not shown). In some embodiments, one or more query units and/or one or more response units are operable to convey information regarding one or more interactions to one or more control units. For example, in some embodiments, second response unit 202 is operable to convey information regarding the interaction between second response unit 202 and first query unit 101 to second control unit 302(*b*). In some embodiments, a control unit is operable to convey information associated with one query unit's or response unit's interactions to another query unit or response unit. For example, in some embodiments, second control unit 302 is operable to convey information regarding the interaction of second response unit 202 with first query unit 101 to second query unit 102(*c*). The information, in some embodiments, can comprise instructions, such as instructions to at least partially disable one or more components of second query unit 102.

Figure 3:
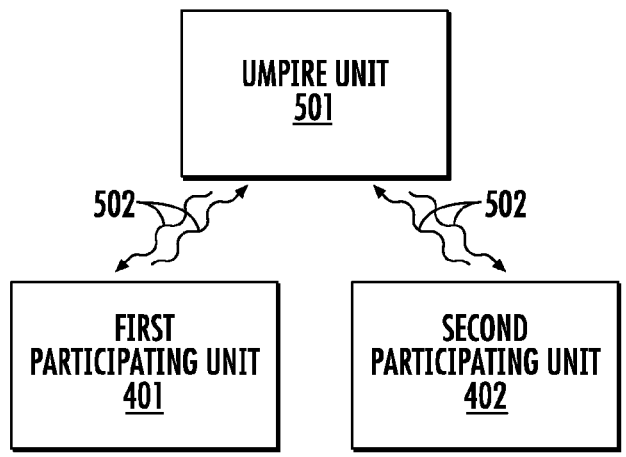
FIG. 3 illustrates some components of an identification and communication system according to some embodiments described herein.

As illustrated schematically in FIG. 3, identification and communication systems described herein, in some embodiments, further comprise an umpire unit 501. In some embodiments, the umpire unit comprises one or more of a receiver, a transmitter, and a computer. In some embodiments, the receiver is operable to receive one or more signals 502 from one or more participating units 401 and 402. In some embodiments, the transmitter is operable to send one or more signals 502 to one or more participating units 401 and 402. The umpire unit 501, in some embodiments, is operable to monitor the activities of one or more participating units 401 and 402 using the receiver. In some embodiments, the umpire unit 501 is operable to regulate the activities of one or more participating units 401 and 402 using the receiver, transmitter, and computer. In some embodiments, the umpire unit 501 is operable to send instructions to one or more participating units 401 and 402 using the transmitter and computer. In some embodiments, the instructions comprise instructions to at least partially disable one or more components of one or more participating units 401 and 402. In some embodiments, the instructions comprise instructions to at least partially enable one or more components of one or more participating units 401 and 402.

In one aspect, identification and communication systems are described herein which, in some embodiments, may offer one or more advantages over prior identification and communication systems. In some embodiments, for example, an identification and communication system described herein is safe, efficient, water resistant, easy to use, sensitive, inexpensive, and interoperable with other identification and communication systems. In some embodiments, an identification and communication system described herein comprises one or more query beam sources that are safe to the human eye. In some embodiments, one or more query beam sources are operable for both "spread beam" and "narrow beam" targeting. In some embodiments, an identification and communication system described herein comprises one or more indicators that can be easily seen by a user under various conditions. In some embodiments, an identification and communication system described herein comprises one or more components that are not easily seen by others, such as enemy combatants. Therefore, in some embodiments, an identification and communication system described herein is operable to provide stealth Identification of Friend or Foe (IFF). In some embodiments, an identification and communication system described herein comprises fewer detectors than prior systems while also exhibiting a substantially similar or greater target surface area sensitive to an incoming query beam. In some embodiments, an identification and communication system described herein comprises one or more detectors that may be placed anywhere on a target, such as a user's body. In some embodiments, an identification and communication system described herein comprises one or more detectors that are more sensitive than previous detectors. In some embodiments, an identification and communication system described herein comprises one or more response units that are relatively water resistant. In some embodiments, an identification and communication system described herein comprises one or more response units that require less frequent maintenance, such as battery replacement. In some embodiments, an identification and communication system described herein comprises one or more response units that are relatively easy to maintain, such as by replacing one or more optical fibers.

B. Disposition of Components

Some embodiments of identification and communication systems described herein can comprise various components disposed in various manners. An identification and communication system described herein, in some embodiments, comprises one or more query units and one or more response units, wherein at least one component of at least one query unit is disposed in a housing. In some embodiments, at least one component of at least one response unit is disposed in a housing. In some embodiments, at least one component of at least one response unit can be disposed in the same housing as at least one component of at least one query unit. In some embodiments, a housing comprises one or more of a triggering mechanism, a query controller, a query beam modulator, a query beam source, a receiver, a response beam demodulator, a response indicator, a query beam demodulator, a response controller, a query indicator, a response beam modulator, a response beam source, a power supply, and a control unit. In some embodiments, a housing comprises a triggering mechanism, a query controller, a query beam modulator, a query beam source, a receiver, a response beam demodulator, a response indicator, a query beam demodulator, a response controller, a query indicator, a response beam modulator, a response beam source, a power supply, and a control unit.

In some embodiments of identification and communication systems described herein, the system comprises a plurality of housings. In some embodiments, an identification and communication system described herein comprises one or more of a triggering mechanism, a query controller, a query beam modulator, a query beam source, a query beam demodulator, a response controller, a query indicator, a response beam modulator, a response beam source, a control unit, and a power supply disposed in a first housing and one or more of a receiver, a response beam demodulator, a query controller, a response indicator, a control unit, and a power supply disposed in a second housing. In some embodiments, an identification and communication system comprises a triggering mechanism, a query controller, a query beam modulator, a query beam source, a query beam demodulator, a response controller, a query indicator, a response beam modulator, a response beam source, a control unit, and a power supply disposed in a first housing and a receiver, a response beam demodulator, a query controller, a response indicator, and a power supply disposed in a second housing. In some embodiments comprising a response indicator, the response indicator is not disposed in the first housing or the second housing. In some embodiments, the response indicator is disposed separately in or on an object, such as a weapon associated with the system.

In some embodiments of identification and communication systems described herein comprising one or more housings, the one or more housings can comprise any housing not inconsistent with the objectives of the present invention. In some embodiments, at least one housing comprises metal. In some embodiments, at least one housing comprises aluminum. In some embodiments, at least one housing comprises plastic. In some embodiments, at least one housing comprises a reinforced material. In some embodiments, at least one housing comprises carbon. In some embodiments, at least one housing comprises fiber glass. In some embodiments, at least one housing comprises one or more of a carbon composite material and a fiber glass composite material.

In some embodiments, at least one housing comprises a mount operable to mount the housing to an object. In some embodiments, the object comprises a weapon. The weapon can be any weapon not inconsistent with the objectives of the present invention. In some embodiments, the weapon comprises a line-of-sight weapon. In some embodiments, the weapon comprises a gun. In some embodiments, the weapon comprises a hand gun, rifle, or .50 caliber weapon. In some embodiments, the weapon comprises a sight. In some embodiments, the weapon comprises an eyepiece, such as a scope. In some embodiments, at least one housing is mounted to the weapon near the balance point of the weapon. In some embodiments, at least one housing is mounted to the weapon in front of and below the sight or eyepiece of the weapon. In some embodiments, the weapon comprises a Picatinny rail (MIL-STD-1913) and at least one housing is mounted to the Picatinny rail. In some embodiments, the weapon comprises a Weaver rail and at least one housing is mounted to the Weaver rail. In some embodiments, at least one housing comprises an eyepiece.

In some embodiments, an identification and communication system described herein comprises at least one component of a response unit disposed in a first housing mounted to a weapon and at least one component of a query unit disposed in a second housing mounted to the weapon. In some embodiments, the weapon comprises an eyepiece and the first housing is mounted to the weapon near the balance point of the weapon and the second housing is mounted to the weapon in front of and below the eyepiece. In some embodiments, the eyepiece is disposed in the first housing. In some embodiments, the weapon comprises a Picatinny rail and the second housing is mounted to the Picatinny rail. In some embodiments, the weapon comprises a Weaver rail and the second housing is mounted to the Weaver rail. In some embodiments, a triggering mechanism, a query controller, a query beam modulator, a query beam source, a query beam demodulator, a response controller, a query indicator, a response beam modulator, a response beam source, a control unit, and a power supply are disposed in the first housing and a receiver, a response beam demodulator, a query controller, a response indicator, and a power supply are disposed in the second housing.

In some embodiments, the response indicator is not disposed in the first housing or the second housing. In some embodiments, the response indicator is disposed separately on the weapon. In some embodiments, a triggering mechanism, a query controller, a query beam modulator, a query beam source, a query beam demodulator, a response controller, a query indicator, a response beam modulator, a response beam source, a control unit, and a power supply are disposed in the first housing; a receiver, a response beam demodulator, a query controller, and a power supply are disposed in the second housing; and a response indicator is disposed separately on the weapon.

In some embodiments, the response indicator comprises a light. In some embodiments, the response indicator comprises a light emitting diode (LED). In some embodiments, the response indicator is adapted to blink when a response beam is received. In some embodiments, the response indicator is adapted to emit light that is visible to an operator of the weapon during aim-and-shoot engagement. In some embodiments, the operator of the weapon uses an eyepiece during aim-and-shoot engagement. In some embodiments, the response indicator is adapted to emit light that is visible to an operator of the weapon during point-and-shoot engagement. In some embodiments, the operator of the weapon uses peripheral vision to see the indicator light during point-and-shoot engagement. In some embodiments, the operator of the weapon places the weapon at or near the operator's hip during point-and-shoot engagement. In some embodiments, the weapon comprises an eyepiece and the response indicator is adapted to emit light visible to an operator of the weapon both through the eyepiece and not through the eyepiece. In some embodiments, the response indicator is adapted to emit light that enters one end of the eyepiece. In some embodiments, the response indicator is adapted to emit light visible to an operator using peripheral vision.

Figure 4:
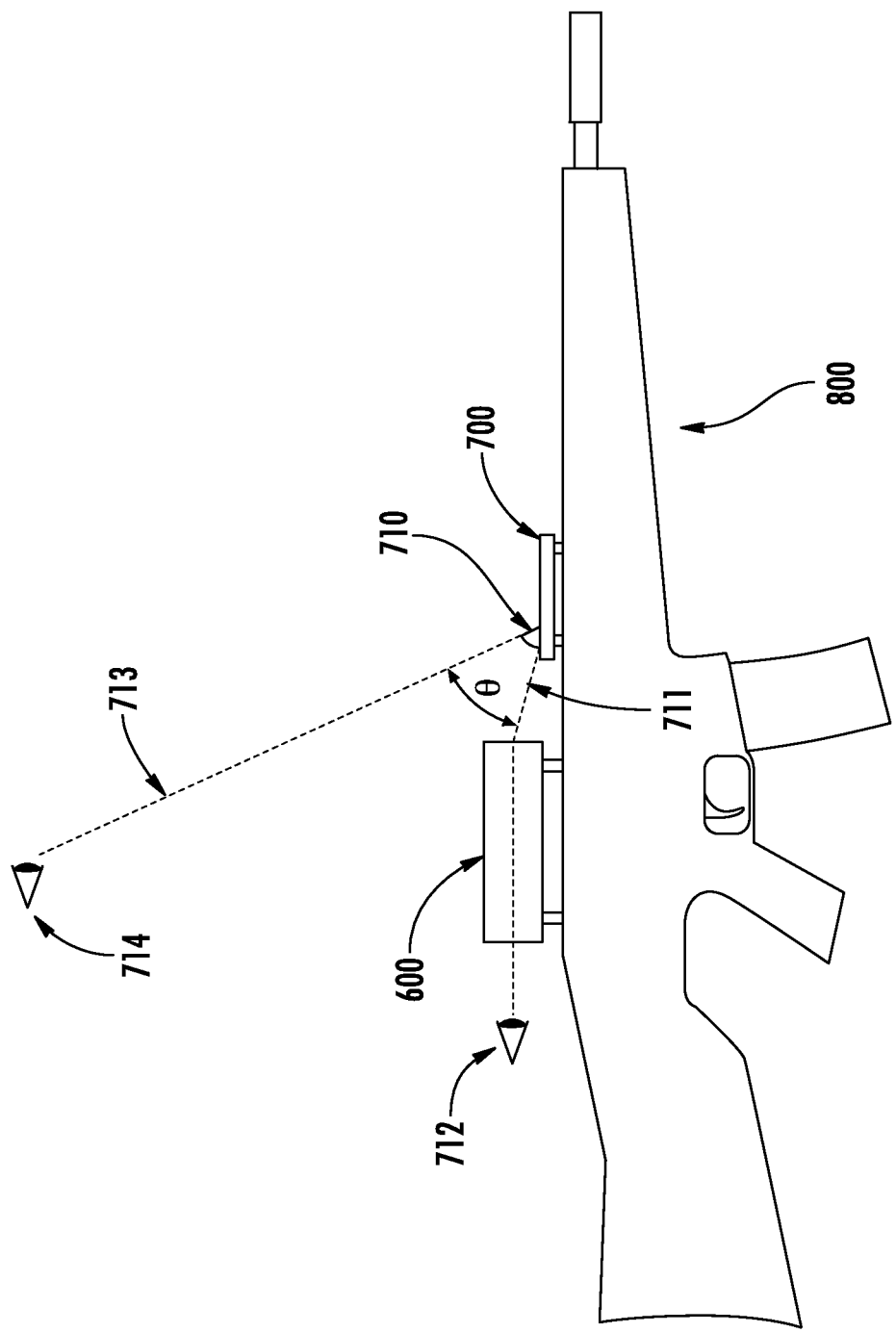
FIG. 4 illustrates some components of an identification and communication system according to some embodiments described herein.

As illustrated in FIG. 4, in some embodiments of identification and communication systems described herein, a system comprises a first housing 600 and a second housing 700 mounted to a weapon 800. In some embodiments, first housing 600 comprises an eyepiece (not shown). In some embodiments, weapon 800 comprises an eyepiece (not shown) separate from first housing 600. In some embodiments, second housing 700 comprises a response indicator 710. In some embodiments, response indicator 710 is adapted to emit light over an angle θ. In some embodiments, the angle θ is acute. In some embodiments, response indicator 710 is adapted to emit first light portion 711 and second light portion 713. In some embodiments, first light portion 711 can enter the eyepiece and be seen by an operator in position 712. In some embodiments, second light portion 713 can be seen by an operator in position 714. In some embodiments, an operator in position 714 can detect second light portion 713 using peripheral vision.

In some embodiments of identification and communication systems described herein, one or more components of a system are carried by dismounted personnel, such as dismounted soldiers. In some embodiments, a query unit described herein is sufficiently small and lightweight to be carried by an individual dismounted soldier. In some embodiments, a response unit described herein is sufficiently small and lightweight to be carried by an individual dismounted soldier. In some embodiments, one or more components of a system described herein are associated with the uniform and equipment of a dismounted soldier. In some embodiments, one or more components are attached to an individual soldier's Improved Load Bearing Equipment (ILBE).

C. Response Units

1. Response Units Comprising Superior Detectors

Some embodiments of identification and communication systems described herein can comprise response units having various features. An identification and communication system described herein, in some embodiments, comprises one or more query units and one or more response units, wherein at least one response unit comprises at least one detector comprising an application specific integrated circuit (ASIC). The ASIC can be any ASIC not incompatible with the objectives of the present invention. In some embodiments, the ASIC comprises a custom-made integrated circuit. In some embodiments, the ASIC comprises one or more of at least one gyrator, at least one amplifier, and at least one gyrator filter. In some embodiments, the ASIC comprises one or more of at least one processor and at least one memory block. In some embodiments, the ASIC comprises one or more of at least one gyrator, at least one amplifier, at least one gyrator filter, at least one processor, and at least one memory block.

In some embodiments, the ASIC is adapted to perform various functions. An ASIC described herein, in some embodiments, can be adapted to perform various functions according to methods known in the art. In some embodiments, an identification and communication system comprises one or more query units and one or more response units, wherein at least one query unit is operable to emit a query beam and at least one response unit comprises at least one detector comprising an application specific integrated circuit (ASIC) comprising an amplifier operable to amplify the query beam. Amplifying the query beam, in some embodiments, comprises amplifying an electrical signal generated by the query beam using one or more amplifiers. Any amplifier not incompatible with the objectives of the present invention may be used. In some embodiments, one or more amplifiers comprise an amplifying circuit.

In some embodiments, the ASIC comprises a filter operable to filter the query beam. Filtering the query beam, in some embodiments, comprises filtering an electrical signal generated by the query beam using one or more filters. Any filter not incompatible with the objectives of the present invention may be used. In some embodiments, one or more filters comprise a gyrator. In some embodiments, one or more filters comprise a tank circuit. In some embodiments, one or more filters comprise a gyrator filter.

Figure 5A:
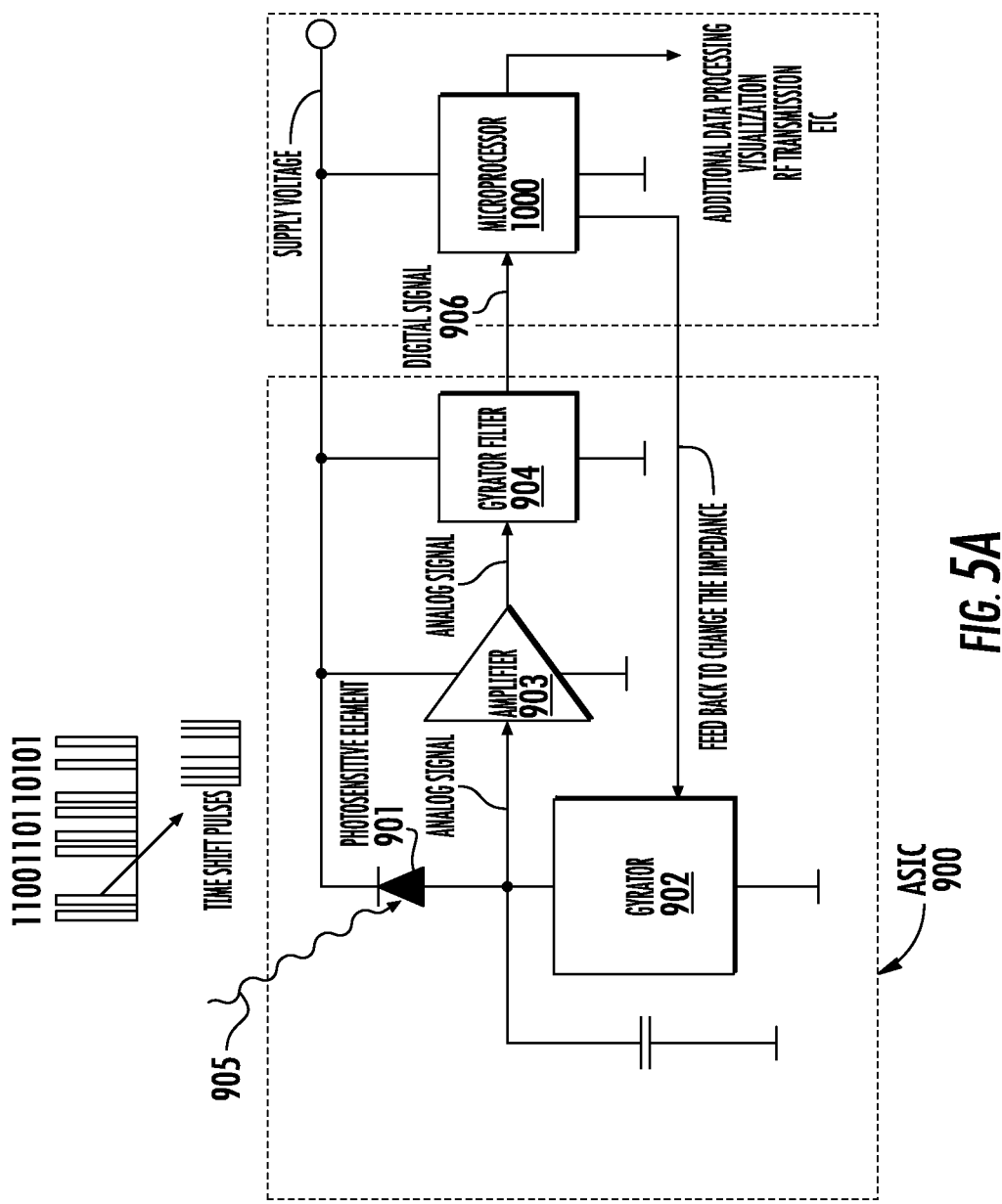
FIG. 5A illustrates some components of a response unit according to some embodiments described herein.

As illustrated in FIG. 5A, a response unit useful in some embodiments described herein comprises a detector comprising an ASIC 900 comprising a photosensitive element 901, a gyrator 902, an amplifier 903, and a gyrator filter 904. In some embodiments, the photosensitive element 901 is operable to detect coded electromagnetic radiation 905, generating an analog signal operable to be amplified and filtered by amplifier 903 and gyrator filter 904. In some embodiments, the ASIC 900 is operable to generate a digital signal that can be sent to microprocessor 1000 for further manipulation and processing as described herein. FIG. 5B illustrates an alternative arrangement useful in some embodiments. FIG. 6 illustrates a gyrator useful in some embodiments described herein.

In some embodiments described herein comprising one or more query units and at least one response unit comprising at least one detector comprising an ASIC, at least one query unit comprises a query beam source operable to emit a coded query beam and the ASIC comprises a demodulator operable to decode the coded query beam. Decoding the coded query beam, in some embodiments, comprises demodulating the query beam. Any demodulator not incompatible with the objectives of the present invention may be used. In some embodiments, the demodulator comprises a circuit. In some embodiments, the demodulator comprises a processor. In some embodiments, the demodulator comprises one or more of an FM demodulator, a PM demodulator, an envelope detector, a quadrature or quadrant detector, a phase locked loop, a Foster-Seeley discriminator, a ratio detector, a pulse code demodulator, and a time shift demodulator.

In some embodiments, the query beam is coded and the ASIC comprises a validator operable to validate the coded query beam. In some embodiments, validating a coded query beam comprises comparing a portion of data contained in the query beam to a validating accept code stored on the ASIC. The comparison, in some embodiments, can be carried out using circuit logic known in the art. Thus, in some embodiments, the validator comprises a processor and a memory block. An accept code, in some embodiments, comprises an arbitrary number. In some embodiments, a plurality of accept codes are stored in a memory block of the ASIC. In some embodiments, each of the plurality of accept codes is used as a validating accept code for validating a coded query beam on a rotating basis. In some embodiments, for example, an ASIC comprises a memory block comprising a plurality of accept codes, such as 10 accept codes. A first accept code, in some embodiments, is assigned by the validator to serve as the validating accept code for a first specific period of time, such as one week or one day. After the specific period of time has elapsed, the validator is operable, in some embodiments, to assign a second accept code to serve as the validating accept code for a second specific period of time. After the second specific period of time has elapsed, the validator is operable, in some embodiments, to assign a third accept code to serve as the validating accept code for a third specific period of time, and so on. In some embodiments, the validator is operable to cycle through the plurality of accept codes, again assigning the first accept code to serve as the validating accept code after the nth (e.g., tenth) accept code has served as the validating accept code for the nth (e.g., tenth) specific period of time. Thus, in some embodiments, the validator is operable to validate a coded query beam according to one or more rotating accept codes stored on the ASIC. In some embodiments, the validator comprises a timing circuit operate to validate a coded query beam according to one or more rotating accept codes stored on the ASIC.

In some embodiments, the query beam is coded and the ASIC comprises an amplifier and a filter operable to amplify and filter the coded query beam. In some embodiments, the query beam is coded and the ASIC comprises an amplifier, a filter, and a validator operable to amplify, filter, and validate the coded query beam. In some embodiments, the query beam is coded and the ASIC comprises an amplifier, a filter, a demodulator, and a validator operable to amplify, filter, decode, and validate the coded query beam.

In some embodiments of identification and communication systems described herein comprising an ASIC, the ASIC is electromagnetically shielded. In some embodiments, the ASIC is shielded from environmental electromagnetic radiation. In some embodiments, shielding comprises reducing the electromagnetic field at or near the ASIC caused by external sources of electromagnetic radiation. In some embodiments, environmental or external electromagnetic radiation comprises random or stray electromagnetic radiation. In some embodiments, the ASIC is electromagnetically shielded by a housing at least partially covering the ASIC. In some embodiments, the housing is a metal-containing housing. In some embodiments, the housing is a copper- or nickel-containing housing. In some embodiments, the housing is a gold- or silver-plated housing.

In some embodiments of identification and communication systems described herein comprising at least one response unit comprising one or more detectors, at least one detector can comprise various components. In some embodiments, at least one detector comprises one or more photosensitive elements. Any photosensitive element not incompatible with the objectives of the invention may be used. In some embodiments, at least one photosensitive element is operable to detect visible electromagnetic radiation. In some embodiments, at least one photosensitive element is operable to detect near infrared electromagnetic radiation. In some embodiments, at least one photosensitive element is operable to detect infrared electromagnetic radiation. In some embodiments, at least one photosensitive element comprises a photodiode. In some embodiments, at least one photosensitive element comprises silicon (Si). In some embodiments, at least one photosensitive element comprises germanium (Ge). In some embodiments, at least one photosensitive element comprises one or more of gallium (Ga), gallium arsenide (GaAs), and indium arsenide (InAs). In some embodiments, at least one photosensitive element comprises indium gallium arsenide ($InGa_xAs_{1-x}$).

In some embodiments, at least one detector comprises a dedicated power supply. A dedicated power supply, in some embodiments, comprises a power supply that provides power to the detector only. The dedicated power supply can comprise any power supply not incompatible with the objectives of the present invention. In some embodiments, the dedicated power supply comprises one or more batteries. In some embodiments, the dedicated power supply comprises an alkaline battery. In some embodiments, the dedicated power supply comprises a lithium ion battery. In some embodiments, the dedicated power supply comprises one or more of a lithium battery and a nickel-metal hydride (NiMH) battery. In some embodiments, the dedicated power supply comprises a solar cell. In some embodiments, the dedicated power supply is substantially physically isolated from one or more other detector components. In some embodiments, the at least one detector comprises one or more circuits and the dedicated power supply is substantially separated from the one or more circuits by a circuit board. In some embodiments, the circuit board comprises a protective coating on the side of the circuit board closer to the dedicated power supply. In some embodiments, the dedicated power supply is disposed in a compartment comprising a removable cover. In some embodiments, the removable cover provides access to the dedicated power supply. In some embodiments, the removable cover does not provide access to one or more other detector components. In some embodiments, the removable cover does not provide access to one or more circuits of the at least one detector. In some embodiments, the dedicated power supply is replaceable. In some embodiments, the dedicated power supply has a lifetime during normal use of the system of about 1 month or more. In some embodiments, the lifetime is about 2 months or more, about 3 months or more, about 4 months or more, about 5 months or more, or about 6 months or more. In some embodiments, the lifetime is about 1 month to about 5 months.

In some embodiments of identification and communication systems described herein comprising at least one response unit comprising one or more detectors, at least one detector can exhibit various sensitivities. An identification and communication system described herein, in some embodiments, comprises one or more query units and one or more response units, wherein at least one response unit comprises at least one detector capable of detecting incident radiation (e.g., a query beam) having a power of about 1 nW or less. In some embodiments, at least one detector is capable of detecting incident radiation having a power of about 100 pW or less. In some embodiments, at least one detector is capable of detecting incident radiation having a power of about 10 pW or less. In some embodiments, at least one detector is capable of detecting incident radiation having a power of about 1 pW to about 10 pW. In some embodiments, at least one detector is capable of detecting incident radiation having a power of about 1 pW or more.

In some embodiments, an identification and communication system comprises one or more query units and one or more response units, wherein at least one query unit comprises a query beam source operable to emit a query beam and at least one response unit comprises at least one detector comprising an application specific integrated circuit (ASIC) comprising an amplifier operable to amplify the query beam, the at least one detector being capable of detecting incident radiation (e.g., a query beam) having a power of about 1 nW or less. In some embodiments, the at least one detector is capable of detecting incident radiation having a power of about 100 pW or less or about 10 pW or less. In some embodiments, the at least one detector is capable of detecting incident radiation having a power of about 1 pW to about 10 pW. In some embodiments, the at least one detector is capable of detecting incident radiation having a power of about 1 pW or more. Detectors having pW sensitivity, in some embodiments, permit the detection of a very low power query beam or a severely attenuated query beam, such as a query beam passing through foliage or dirt.

2. Response Units Comprising Detectors Comprising Optical Fibers

An identification and communication system described herein, in some embodiments, comprises one or more query units and one or more response units, wherein at least one response unit comprises one or more detectors comprising one or more optical fibers operable to direct one or more signals received from at least one query unit to the one or more detectors. In some embodiments, a detector comprises a plurality of optical fibers. In some embodiments of detectors comprising one or more optical fibers, the one or more optical fibers can be connected or associated with the detector in various ways known in the art. In some embodiments, at least one optical fiber is connected to a detector with an adhesive. In some embodiments, the adhesive comprises an epoxy. In some embodiments, the adhesive comprises an acrylic adhesive.

Figure 7:
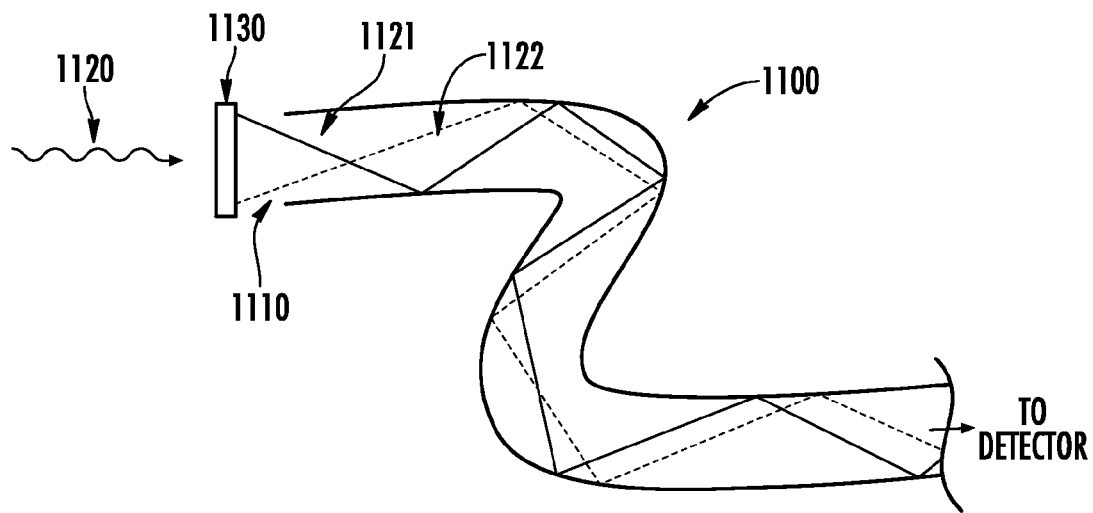
FIG. 7 illustrates an optical fiber according to some embodiments described herein.

Identification and communication systems comprising optical fibers described herein, in some embodiments, comprise optical fibers capable of receiving signals in various ways. In some embodiments, at least one optical fiber is capable of receiving a signal from at least one query unit through a first end of the optical fiber. As illustrated in FIG. 7, an optical fiber 1100 useful in some embodiments described herein comprises a first end 1110 operable to receive at least a portion of electromagnetic radiation 1120, which can comprise a signal from a query unit, such as a query beam. In some embodiments, an optical lens 1130 is operable to direct portions of electromagnetic radiation 1121 and 1122 into the optical fiber. The use of a lens, in some embodiments, enables a larger amount of electromagnetic radiation to be captured and directed into the optical fiber. In some embodiments, the optical fiber is operable to direct portions of electromagnetic radiation 1121 and 1122 to one or more detectors (not shown).

In some embodiments, at least one optical fiber is capable of receiving a signal from at least one query unit through the side of the optical fiber. In some embodiments, at least about 1% of the surface area of the side of at least one optical fiber is operable to receive a signal from at least one query unit. In some embodiments, at least about 10% of the surface area of the side of at least one optical fiber is operable to receive a signal from at least one query unit. In some embodiments, at least about 30%, at least about 50%, at least about 70%, at least about 80%, or at least about 90% of the surface area of the side of at least one optical fiber is operable to receive a signal from at least one query unit. In some embodiments, at least about 0.25 inches of the length of at least one optical fiber is operable to receive a signal from at least one query unit. In some embodiments, about 0.25 inches to about 2 inches of the length of at least one optical fiber is operable to receive a signal from at least one query unit.

Identification and communication systems described herein, in some embodiments, comprise various optical fibers. Any optical fiber not inconsistent with the objectives of the present invention may be used. Optical fibers useful in some embodiments described herein can have various compositions and sizes, based on desired characteristics such as fiber strength, fiber flexibility, transmission distance, and wavelength of light. In some embodiments, at least one fiber comprises a single-mode fiber (SMF). In some embodiments, at least one fiber comprises a multi-mode fiber (MMF).

In some embodiments, at least one optical fiber comprises silica. In some embodiments, at least one optical fiber comprises sapphire. In some embodiments, at least one optical fiber comprises one or more of fluorozirconate, fluoroaluminate, and chalcogenide glasses. In some embodiments, at least one optical fiber comprises an organic polymer. In some embodiments, at least one optical fiber comprises a plastic. In some embodiments, at least one optical fiber comprises a fluorescent plastic fiber (FPF).

In some embodiments, at least one optical fiber comprises an absorbing material. Any absorbing material not inconsistent with the objectives of the present invention may be used. In some embodiments, the absorbing material is operable to absorb visible light. In some embodiments, the absorbing material is operable to absorb near infrared (NIR) light. In some embodiments, the absorbing material is operable to absorb infrared (IR) light. In some embodiments, the absorbing material is operable to absorb electromagnetic radiation emitted by a query unit comprising a query beam source described herein and to emit electromagnetic radiation having a different wavelength. For example, in some embodiments, the absorbing material is operable to absorb near infrared (NIR) light and emit infrared (IR) light. Therefore, in some embodiments, the absorbing material is operable as a downconverter. In some embodiments, the absorbing material is operable to absorb only a portion of the radiation incident on the fiber. In some embodiments, the absorbing material is operable to absorb about 90% or less of the incident radiation. In some embodiments, the absorbing material is operable to absorb about 80% or less, about 70% or less, about 60% or less, about 50% or less, about 40% or less, about 30% or less, about 20% or less, or about 10% or less of the incident radiation. Therefore, in some embodiments, the absorbing material is operable as a filter. In some embodiments, the absorbing material is a liquid. In some embodiments, the absorbing material is a fluorescent liquid. In some embodiments, the absorbing material is a dye. Non-limiting examples of absorbing materials useful in some embodiments include Milk and AP39-TSC.

Figure 8:
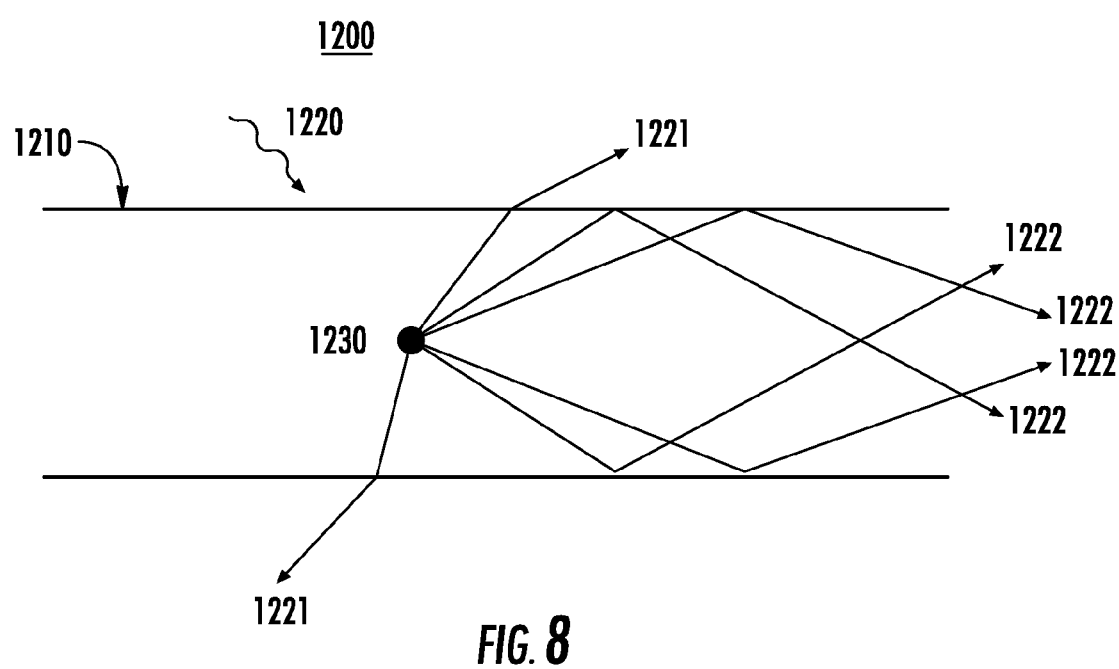
FIG. 8 illustrates an optical fiber according to some embodiments described herein.

As illustrated in FIG. 8, an optical fiber 1200 useful in some embodiments described herein comprises at least one side 1210 operable to receive at least a portion of electromagnetic radiation 1220. In some embodiments, the optical fiber comprises a fluorescent plastic fiber (FPF). In some embodiments, the optical fiber further comprises at least one absorbing material 1230 which is operable to absorb at least a portion of electromagnetic radiation 1220 and then emit one or more of electromagnetic radiation portions 1221 and 1222. In some embodiments, electromagnetic radiation portions 1221 and 1222 have a lower energy than the absorbed portion of electromagnetic radiation 1220. In some embodiments, optical fiber 1200 is operable to retain at least some of the emitted electromagnetic radiation portions 1221 and 1222 within the fiber, such as through the substantially total internal reflection of electromagnetic radiation portion 1222. In some embodiments, at least some of the emitted electromagnetic radiation 1221 may not be retained within the fiber. In some embodiments, the optical fiber is operable to direct one or more portions of retained electromagnetic radiation to one or more detectors.

In some embodiments, at least one optical fiber has an inner diameter of about 0.1 µm to about 10 µm. In some embodiments, at least one optical fiber has an outer diameter of about 0.5 µm to about 50 µm. In some embodiments, at least one optical fiber has a length of about 1 cm to about 2 m.

The ability of an optical fiber described herein, in some embodiments, to selectively retain only a desired portion of incident radiation from a query unit permits efficient use of one or more detectors. In some embodiments, use of an optical fiber as described herein permits the use of a more sensitive detector than otherwise feasible because the selective absorption, retention, and direction of incident radiation to the detector prevents overloading of the detector with the entirety of the incident radiation from the query unit or with ambient light, such as from the sun or man-made lights. In some embodiments, use of an optical fiber as described herein obviates the need for a separate filter associated with a detector. In some embodiments, use of an optical fiber as described herein reduces interference caused by magnetic and electric fields in the environment.

In some embodiments of identification and communication systems described herein comprising one or more optical fibers, at least one optical fiber is disposed in or on an object. Any object not inconsistent with the objectives of the present invention may be used. In some embodiments, at least one optical fiber is disposed in or on a textile. Any textile not inconsistent with the objectives of the present invention may be used. In some embodiments, the textile comprises a garment. Any garment not inconsistent with the objectives of the present invention may be used. Non-limiting examples of garments suitable for use in some embodiments include harnesses, shirts, trousers, helmets, hats, caps, jackets, rucksacks, boots, and shoes. In some embodiments, the garment comprises standard Improved Load Bearing Equipment (ILBE). In some embodiments, the garment comprises one or more of a harness, a helmet, a shirt, trousers, a rucksack, and footwear. In some embodiments, the garment is worn by a soldier. In some embodiments, the garment is part of a soldier's uniform. In some embodiments, the garment is worn by emergency personnel or first responders. In some embodiments, the garment is worn by one or more of police, firefighters, and medical personnel. In some embodiments, the garment is part of a uniform.

Figure 9:
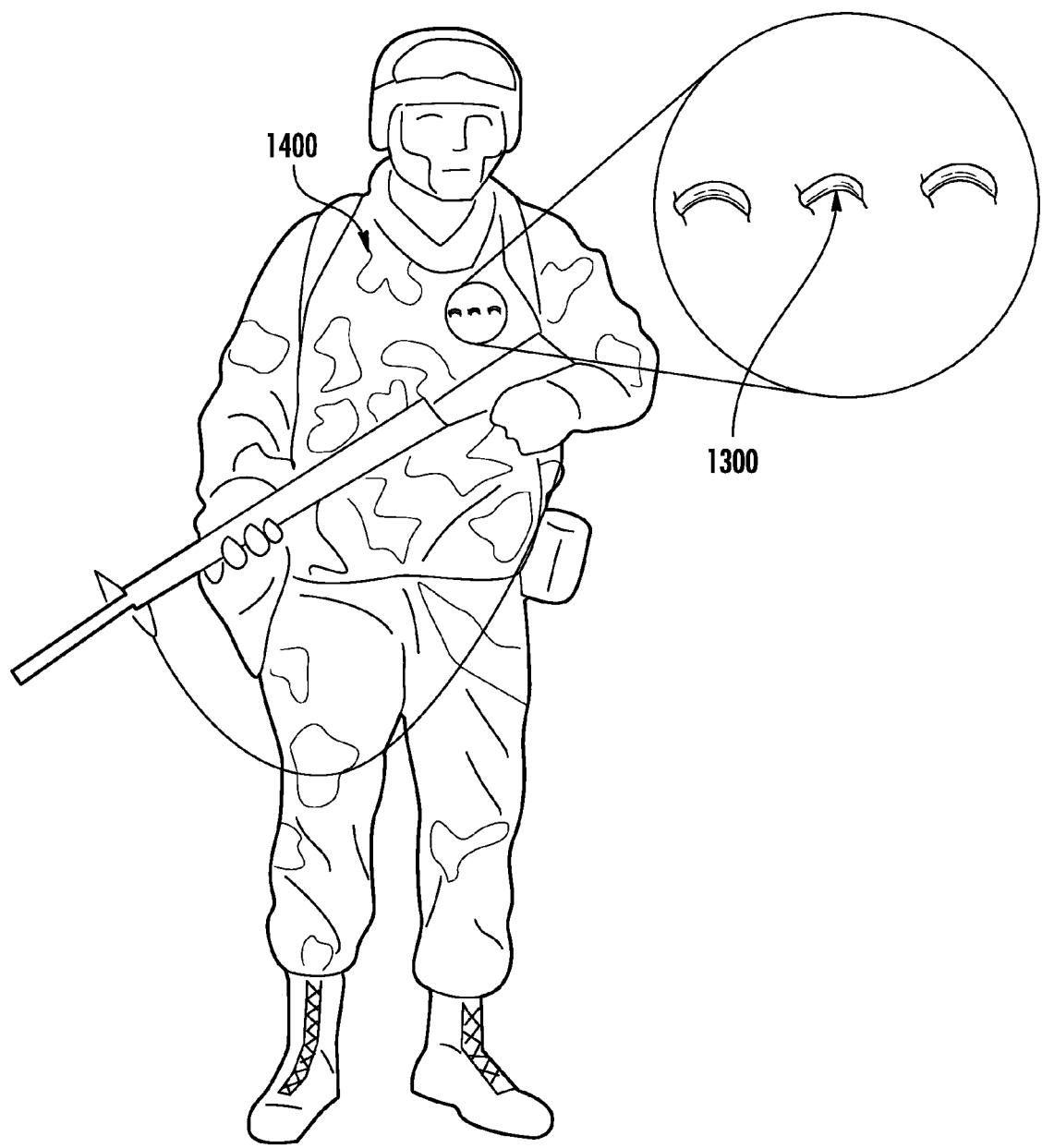
FIG. 9 illustrates an optical fiber disposed in a garment according to some embodiments described herein.

As illustrated in FIG. 9, in some embodiments, an optical fiber 1300 is disposed in a garment 1400. In some embodiments, the optical fiber is woven into the garment. In some embodiments, the optical fiber is woven into the garment such that a portion of the exterior surface area of at least one side of the fiber is exposed. In some embodiments, the optical fiber is woven into the garment such that at least a portion of the exterior surface area of the fiber is disposed at or above an outer surface of the garment. An optical fiber disposed in a garment described herein, in some embodiments, is not easily visible to enemy combatants.

In some embodiments, at least one optical fiber is disposed in or on a vehicle. Non-limiting examples of vehicles suitable for use in some embodiments include jeeps, trucks, armored personnel vehicles, tanks, trains, airplanes, helicopters, boats, and ships.

In some embodiments, at least one optical fiber is disposed in or on an explosive device. In some embodiments, at least one optical fiber is disposed in or on a box or crate. In some embodiments, the box or crate comprises one or more of provisions, equipment, and supplies. In some embodiments, at least one optical fiber is disposed in or on a structure. In some embodiments, at least one optical fiber is disposed in or on a bridge or building.

In some embodiments of identification and communication systems described herein comprising at least one optical fiber disposed in or on a textile, at least one optical fiber is disposed in or on the textile in various ways. One or more optical fibers described herein may be disposed in or on a textile described herein in any manner not inconsistent with the objectives of the present invention. In some embodiments, at least one optical fiber is woven into the textile. In some embodiments, at least one optical fiber is disposed in a sleeve or casing attached to the textile. In some embodiments, at least one optical fiber is adhered to the textile with an adhesive. In some embodiments, at least one optical fiber is attached to the textile with one or more fasteners, such as staples, clips, loops, or tape. In some embodiments, at least one optical fiber is disposed in a mat or a web disposed in or on the textile. In some embodiments, at least one optical fiber is woven into the mat or web. In some embodiments comprising at least one optical fiber disposed in a mat or web disposed in or on a textile, the mat or web may be disposed in or on the textile in any manner not inconsistent with the objectives of the present invention. In some embodiments, a mat or web comprising one or more optical fibers described herein is disposed in or on a textile with an adhesive or one or more fasteners.

In some embodiments of identification and communication systems described herein comprising at least one optical fiber disposed in or on a textile, a first end of at least one optical fiber is disposed at or above an outer surface of the textile. In some embodiments, a first end of at least one optical fiber is disposed at or above an outer surface of the textile at a substantially perpendicular angle to the outer surface. In some embodiments, a first end of at least one optical fiber is disposed at or above an outer surface of the textile at an acute angle to the outer surface. In some embodiments, a cap at least partially covers the first end of at least one optical fiber. In some embodiments, the cap is operable as a lens. In some embodiments, the cap is less than about one inch in diameter. In some embodiments, the cap is less than about 0.5 inches in diameter. In some embodiments, the cap is less than about 0.5 inches in height. In some embodiments, the cap is less than about 0.25 inches in height. In some embodiments, the cap is less than about 0.5 inches in diameter and less than about 0.25 inches in height.

Figure 10A:
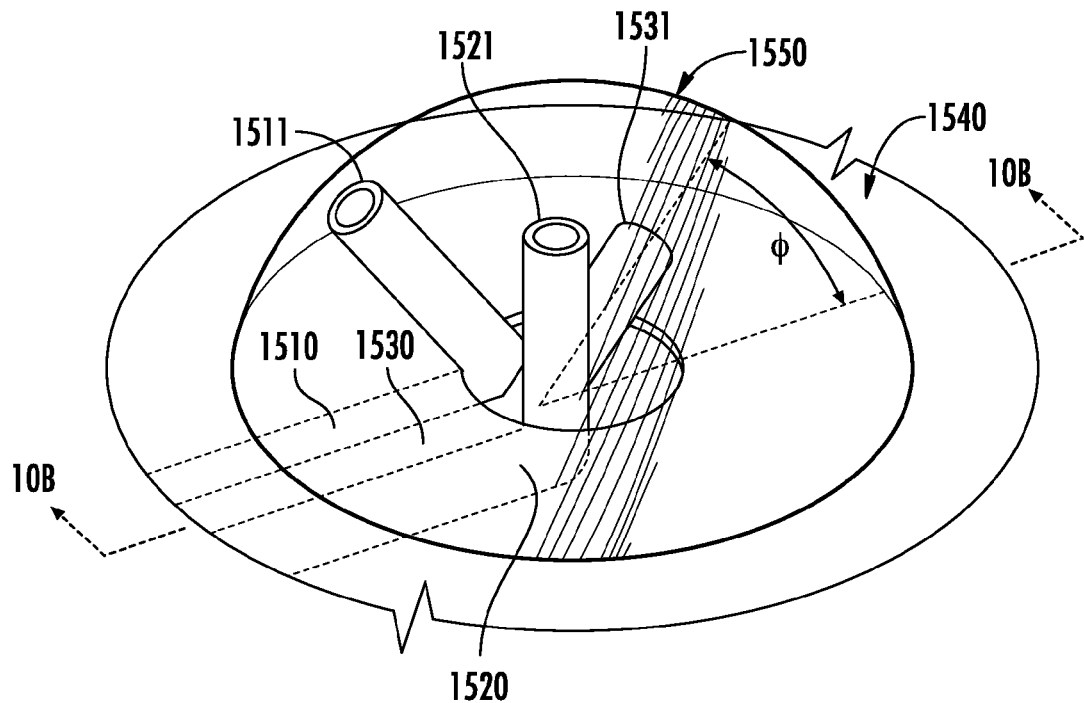
FIG. 10A is a perspective view of a plurality of optical fibers disposed in a textile according to some embodiments described herein.
Figure 10B:
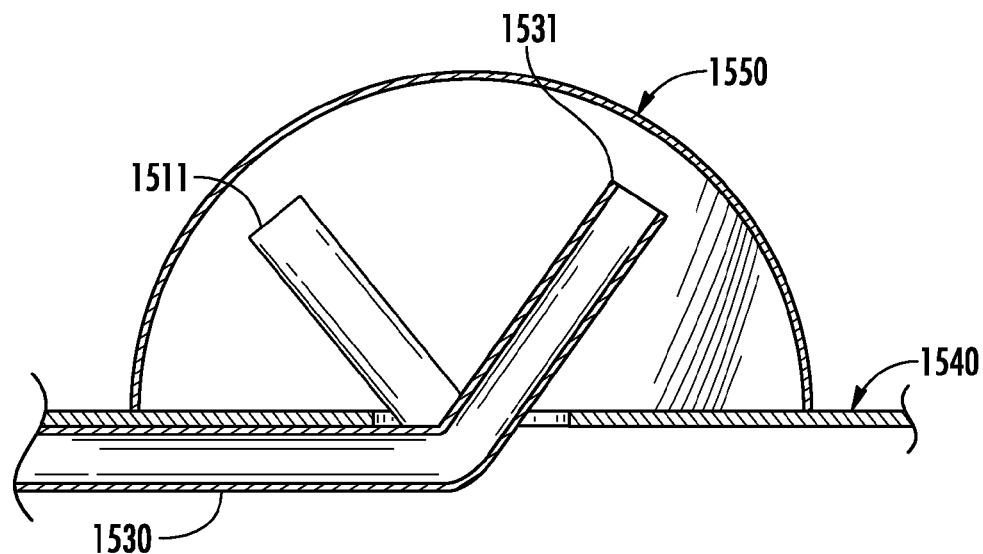
FIG. 10B is a cross-sectional view of the plurality of optical fibers disposed in the textile of FIG. 10A, taken along line 10B shown in FIG. 10A.
Figure 10C:
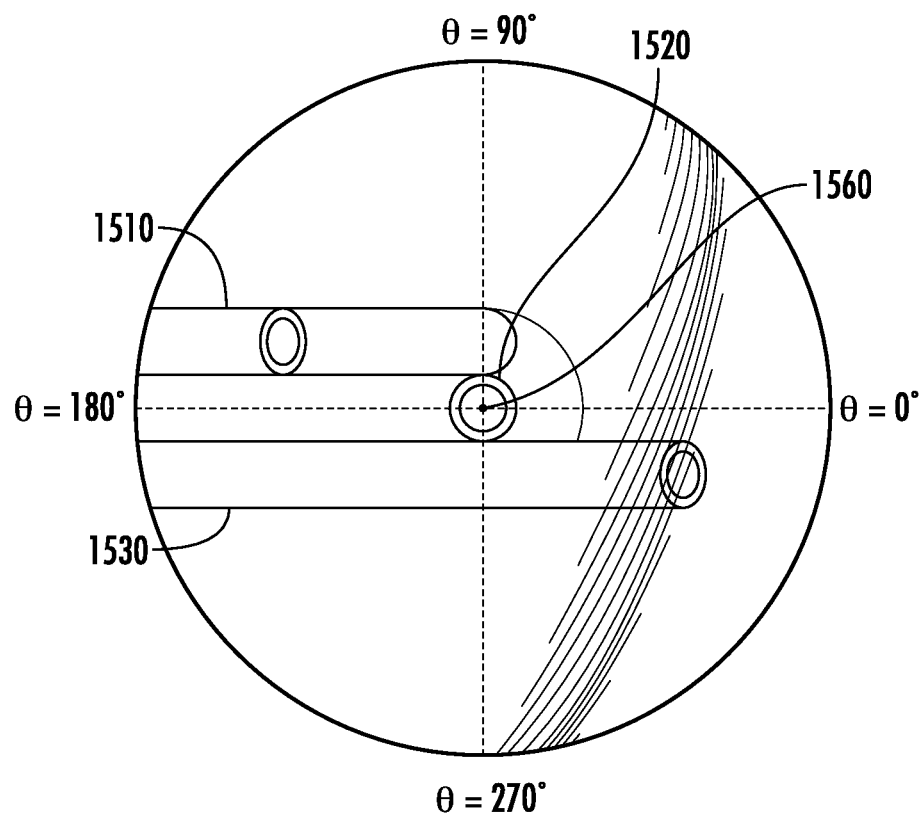
FIG. 10C is a top view of the plurality of optical fibers disposed in the textile of FIG. 10A.

As illustrated in FIGS. 10A, 10B, and 10C in some embodiments, a plurality of optical fibers 1510, 1520, and 1530 are disposed in a textile such that first ends 1511, 1521, and 1531 of fibers 1510, 1520, and 1530 are disposed at or above an outer surface 1540 of the textile. It is to be understood that optical fibers 1510, 1520, and 1530 and first ends 1511, 1521, and 1531 are merely representative of some embodiments described herein and are in no way intended to limit the number of optical fibers that may be used in some embodiments. In some embodiments, one or more of first ends 1511, 1521, and 1531 may be disposed at or above the outer surface at an angle $\phi$ relative to the outer surface. In some embodiments, $\phi$ is about 90°. In some embodiments, $\phi$ is acute. Similarly, in some embodiments, one or more of first ends 1511, 1521, and 1531 may be disposed at or above an outer surface at an angle $\theta$ relative to origin point 1560. In some embodiments, $\theta$ is any angle between 0° and about 360°. Therefore, in some embodiments, a plurality of first ends disposed at or above an outer surface provides hemispherical detection of incident signals. In some embodiments, the plurality of first ends is operable to receive a signal from substantially any direction wherein $\phi$=about 0° to about 180° and $\theta$=0° to 360°.

In some embodiments, a cap 1550 at least partially covers one or more of ends 1511, 1521, and 1531. In some embodiments, the cap is operable to protect the first ends from the environment. In some embodiments, the cap is operable as a lens as described above in reference to FIG. 7.

In some embodiments of identification and communication systems described herein comprising at least one optical fiber disposed in or on a textile, one or more optical fibers comprise various percentages of the outer surface area of the textile. In some embodiments, at least one optical fiber comprises at least about 0.01% of the outer surface area of the textile. In some embodiments, at least one optical fiber comprises at least about 0.1% of the outer surface area of the textile. In some embodiments, at least one optical fiber comprises between about 0.01% and about 0.1%, between about 0.01% and about 1%, between about 0.01% and about 10%, or between about 1% and about 50% of the outer surface area of the textile.

In some embodiments of identification and communication systems described herein comprising one or more optical fibers disposed at or above an outer surface of a textile, at least about 0.01% of the exterior surface area of at least one fiber is disposed at or above an outer surface of the textile. In some embodiments, at least about 1% of the exterior surface area of at least one fiber is disposed at or above an outer surface area of the textile. In some embodiments, at least about 10%, at least about 20%, at least about 30%, at least about 40%, at least about 50%, at least about 60%, at least about 70%, at least about 80%, or at least about 90% of the exterior surface area of at least one fiber is disposed at or above an outer surface area of the textile.

In some embodiments of identification and communication systems described herein comprising one or more optical fibers disposed in a textile, a plurality of optical fibers described herein is disposed in a textile. In some embodiments, a plurality of optical fibers is disposed in the textile substantially in layers. In some embodiments, removing a first optical fiber from a textile reveals a second optical fiber beneath the first optical fiber. In some embodiments, the second optical fiber exhibits one or more of the characteristics of the first optical fiber. In some embodiments, a response unit described herein is operable to be easily maintained by removing a first optical fiber and revealing a second optical fiber beneath the first optical fiber. In some embodiments of identification and communication systems described herein comprising a plurality of optical fibers disposed in a textile, the plurality of optical fibers is operable to distinguish a first received signal incident on a first part of the textile from a second received signal incident on a second part of the textile.

In some embodiments of identification and communication systems described herein comprising at least one optical fiber disposed on or in an object such as a vehicle, structure explosive device, box, or crate, at least one optical fiber is disposed on or in the object in various ways. One or more optical fibers described herein may be disposed on an object described herein in any manner not inconsistent with the objectives of the present invention. In some embodiments, at least one optical fiber is disposed in a sleeve or casing attached to the object. In some embodiments, at least one optical fiber is adhered to the object with an adhesive. In some embodiments, at least one optical fiber is attached to the object with one or more fasteners, such as staples, clips, loops, or tape. In some embodiments, at least one optical fiber is disposed in a mat or a web disposed in or on the object. In some embodiments, at least one optical fiber is woven into the mat or web. In some embodiments comprising at least one optical fiber disposed in a mat or web disposed in or on an object, the mat or web may be disposed in or on the object in any manner not inconsistent with the objectives of the present invention. In some embodiments, a mat or web comprising one or more optical fibers described herein is disposed in or on an object with an adhesive or one or more fasteners.

D. Query Units

1. Query Units Comprising LEDs

Some embodiments of identification and communication systems described herein can comprise various query units having various features. An identification and communication system described herein, in some embodiments, comprises one or more query units and one or more response units, wherein at least one query unit comprises a query beam source comprising a light emitting diode (LED) operable to emit a query beam. In some embodiments, the query beam is coded. In some embodiments, the query beam is substantially collimated. In some embodiments comprising a substantially collimated query beam, the query beam has a diameter between about 20 inches and about 100 inches at about 100 m. In some embodiments the query beam has a diameter between about 28 inches and about 36 inches at about 100 m. In some embodiments, the query beam has a diameter between about 30 inches and about 34 inches at about 100 m. In some embodiments, the query beam has a divergence of about 10 mrad to about 500 mrad.

In some embodiments comprising an LED operable to emit a query beam, the query beam comprises visible light. In some embodiments, the query beam comprises near infrared light. In some embodiments, the query beam comprises infrared light. In some embodiments, the query beam has a power between about 10 mW and about 500 mW. In some embodiments, the query beam has a power between about 50 mW and about 150 mW or between about 80 mW and about 120 mW.

In some embodiments comprising an LED operable to emit a query beam, the LED can have various characteristics. In some embodiments, the LED has various power outputs, sizes, and compositions. In some embodiments, the LED comprises a 1-W LED. In some embodiments, the LED comprises a 1- to 10-W LED. In some embodiments, the LED has a diameter of about 5 mm or less. In some embodiments, the LED has a diameter of about 1 mm or less. In some embodiments, the LED comprises gallium arsenide (GaAs). In some embodiments, the LED comprises aluminum gallium arsenide ($Al_xGa_{1-x}As$). In some embodiments, at least one query unit comprises a query beam source comprising a plurality of LEDs described herein. In some embodiments, the plurality of LEDs comprises one or more arrays of LEDs described herein.

2. Query Units Operable to Emit Composite Query Beams

As illustrated in FIG. 11, an identification and communication system described herein, in some embodiments, comprises one or more query units and one or more response units, wherein at least one query unit is operable to emit a composite query beam comprising a first component beam and a second component beam. In some embodiments, an identification and communication system comprises one or more query units and one or more response units, wherein at least one query unit comprises a first query beam source operable to emit a first component beam and a second query beam source operable to emit a second component beam. In some embodiments, the first query beam source comprises an LED and the second query beam source comprises a laser. In some embodiments, the first component beam or the second component beam is substantially collimated. In some embodiments, the first component beam is substantially collimated. In some embodiments, the second component beam is substantially collimated. In some embodiments, the first component beam is substantially collimated and the second component beam is substantially collimated. In some embodiments, the first component beam has a higher divergence than the second component beam. In some embodiments, the first component beam has a larger diameter than the second component beam. In some embodiments, the first component beam and the second component beam are substantially concentric.

With reference to FIG. 11, in some embodiments described herein, a composite query beam 1600 comprises a first component beam 1610 emitted from an LED and a second component beam 1620 emitted from a laser. In the embodiment illustrated in FIG. 11, first component beam 1610 has a higher divergence and a larger diameter than the second component beam 1620, and first component beam 1610 and second component beam 1620 are substantially concentric.

Figure 12:
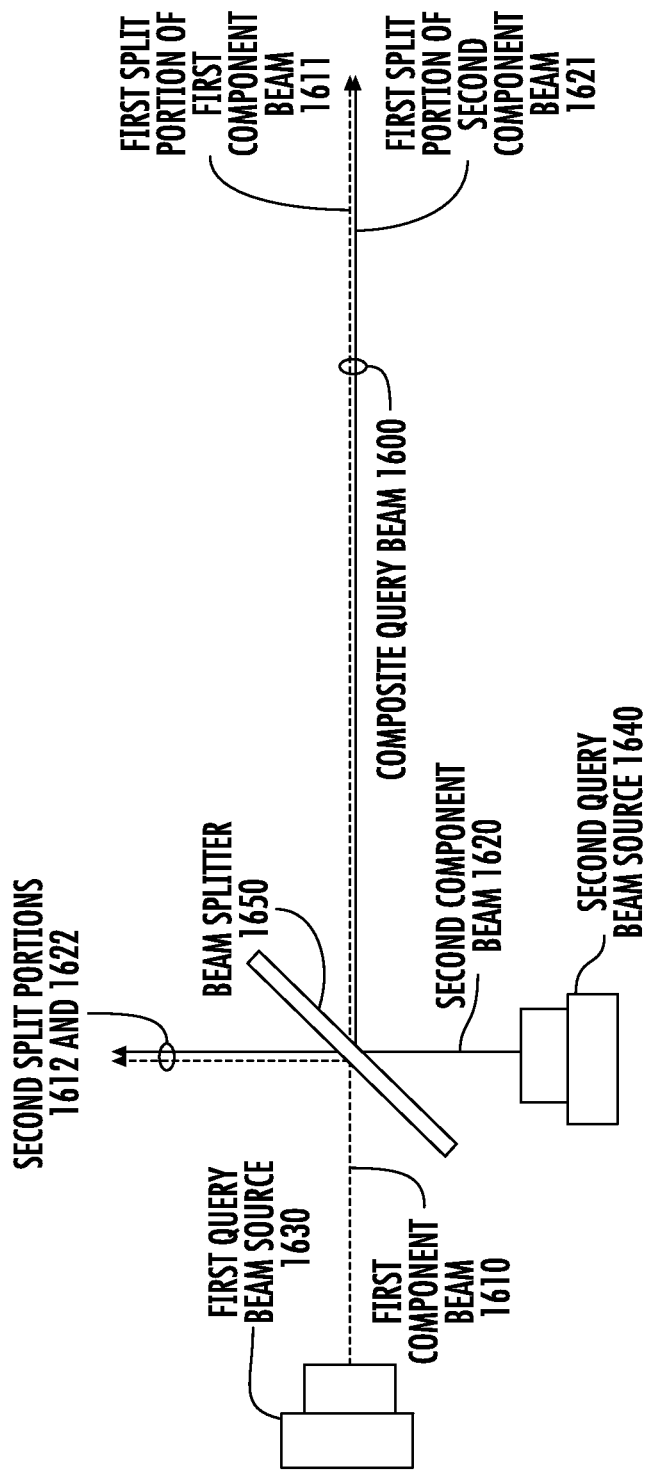
FIG. 12 illustrates some components of a query unit according to some embodiments described herein.

As illustrated in FIG. 12, in some embodiments comprising at least one query unit operable to emit a composite query beam, the composite query beam is emitted from a plurality of query beam sources. In some embodiments, the query beam sources are adapted to emit beams that are not initially parallel to one another. In some embodiments, for example, the emitted beams are initially perpendicular to one another. In some embodiments of identification and communication systems described herein comprising at least one query unit operable to emit a composite query beam, the system further comprises a beam splitter. A beam splitter, in some embodiments, is operable to split a beam of light into two beams of light. Any beam splitter not incompatible with the objectives of the present invention may be used. In some embodiments, the beam splitter comprises two prisms joined at the base. In some embodiments, the beam splitter comprises a half-silvered mirror. In some embodiments, the beam splitter comprises a dichroic prism. A beam splitter, in some embodiments, can be disposed in the path of one or more beams. In some embodiments, the beam splitter is disposed in the path of the first component beam. In some embodiments, the beam splitter is disposed in the path of the second component beam. In some embodiments, the beam splitter is disposed in the path of both the first component beam and the second component beam. In some embodiments comprising a beam splitter disposed in the path of both a first component beam and a second component beam, the beam splitter is adapted to direct a first portion of the first component beam in substantially the same direction as a first portion of the second component beam. In some embodiments, the first component beam and the second component beam comprise electromagnetic radiation of differing wavelengths.

With reference to FIG. 12, in some embodiments described herein, a composite query beam 1600 is emitted from a plurality of query beam sources, such as first query beam source 1630 and second query beam source 1640. First query beam source 1630, in the embodiment of FIG. 12, is operable to emit first component beam 1610, and second query beam source 1640 is operable to emit second component beam 1620. First component beam 1610 and second component beam 1620 are not initially parallel. However, beam splitter 1650 is disposed in the path of each component beam and is adapted to split each component beam into first split portions 1611 and 1621 and second split portions 1612 and 1622. In the embodiment of FIG. 12, first split portions 1611 and 1621 of first and second component beams 1610 and 1620, respectively, combine to form composite query beam 1600. In other embodiments, second split portions 1612 and 1622 of first and second component beams 1610 and 1620, respectively, could combine to form a composite query beam.

3. Query Units Comprising Handheld Devices

An identification and communication system described herein, in some embodiments, comprises one or more query units and one or more response units, wherein at least one query unit is a handheld device. In some embodiments, at least one query unit can be any handheld device not incompatible with the objectives of the present invention. In some embodiments, the handheld device does not comprise a weapon and is not mounted on a weapon. Identification and communication systems described herein comprising at least one query unit that is a handheld device that does not comprise a weapon and is not mounted on a weapon can, in some embodiments, permit a user to carry out a query, such as an IFF query, without pointing a weapon at a target. Pointing a weapon at a target, such as a person, can be an act of hostility in some situations, permitting the target himself to immediately engage in hostile acts under the rules of engagement.

Figure 13:
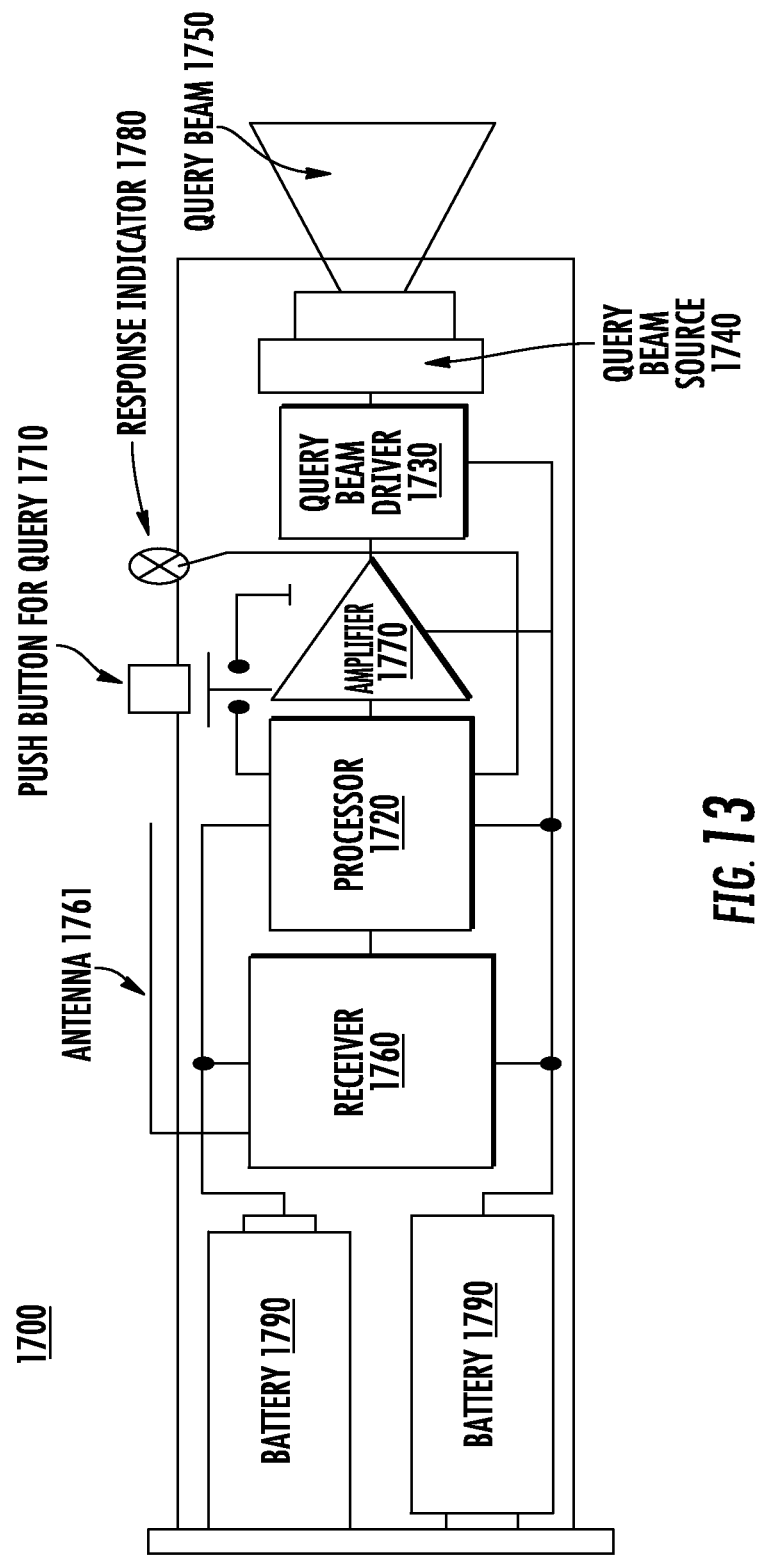
FIG. 13 illustrates some components of a handheld device according to some embodiments described herein.

In some embodiments of systems described herein wherein at least one query unit is a handheld device, the at least one query unit comprises one or more components. In some embodiments, the one or more components can comprise any query unit component described herein. In some embodiments, for example, the at least one query unit comprises a query beam source. In some embodiments, the one or more components are operable to perform a query function comprising a method of identification and communication described herein. As illustrated in FIG. 13, the one or more components, in some embodiments, can be disposed in the handheld device in various manners. The one or more components, in some embodiments, may be disposed in the handheld device in any manner not inconsistent with the objectives of the present invention. With reference to FIG. 13, a handheld device 1700, in some embodiments, comprises push button (triggering mechanism) 1710 operable to initiate a query, microprocessor 1720, query beam driver 1730, query beam source 1740 operable to emit query beam 1750, receiver 1760 comprising antenna 1761, amplifier 1770, response indicator (such as an LED) 1780, and batteries (power supply) 1790. In some embodiments, microprocessor 1720 comprises one or more of a query controller, a query beam modulator, and a response beam demodulator.

In some embodiments, one or more components shown in the embodiment of FIG. 13 can comprise various components described herein. For example, in some embodiments, the query beam source comprises an LED described herein having features described herein. In some embodiments, the query beam source comprises a laser described herein having features described herein. In some embodiments comprising a query beam source comprising a laser, the handheld device further comprises a sight for aiming the laser. In some embodiments, the sight is on top of one end of the handheld device. In some embodiments, the receiver comprises a radio frequency receiver. In some embodiments, the triggering mechanism comprises a push button. In some embodiments, the triggering mechanism comprises a slide switch. In some embodiments, the power supply comprises a connector operable to receive power from an external power source, such as a Universal Serial Bus (USB) connector.

In some embodiments of systems described herein wherein at least one query unit is a handheld device, the handheld device comprises one or more other components, features, or functionalities. In some embodiments, one or more other components, features, or functionalities of the handheld device can be operated independently of the handheld device's query function.

Figure 14:
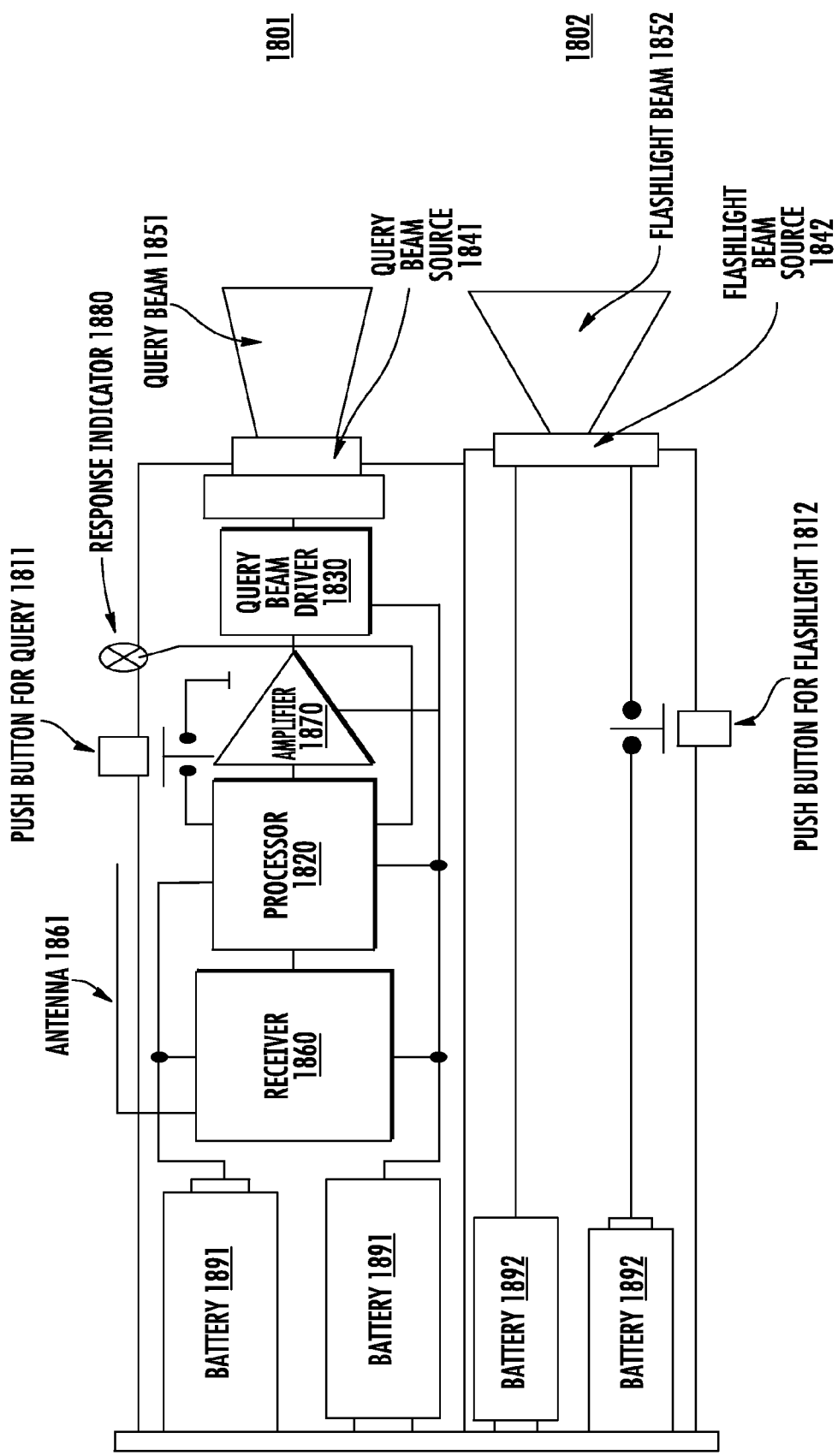
FIG. 14 illustrates some components of a handheld device according to some embodiments described herein.

As illustrated in FIG. 14, in some embodiments of systems described herein comprising at least one query unit that is a handheld device, the handheld device comprises a flashlight. In some embodiments, the flashlight comprises any flashlight not incompatible with the objectives of the present invention. In some embodiments, the flashlight comprises one or more components. In some embodiments, one or more components of the flashlight are disposed in a compartment separate from one or more components of the query unit operable to perform a query function. In some embodiments, one or more components of the flashlight are disposed in the same compartment as one or more components of the query unit operable to perform a query function.

In some embodiments, the handheld device comprises a dedicated switch operable to turn the flashlight on and off. A dedicated switch, in some embodiments, comprises a switch operable only to turn the flashlight on and off. Any switch not incompatible with the objectives of the present invention may be used. In some embodiments, the handheld device comprises a dedicated triggering mechanism operable to initiate, continue, or end a query. A dedicated triggering mechanism, in some embodiments, comprises a triggering mechanism operable only to initiate, continue, or end a query. Any triggering mechanism not inconsistent with the objectives of the present invention may be used. In some embodiments comprising a dedicated switch and a dedicating triggering mechanism, the dedicated switch comprises a first push button or first slide switch and the dedicated triggering mechanism comprises a second push button or second slide switch. In some embodiments, the first push button or slide switch and the second push button or slide switch have differing sizes or textures. In some embodiments, the first push button or slide switch and the second push button or slide switch are spatially separated on the handheld device. In some embodiments, the handheld device comprises a toggle switch operable to turn the flashlight on and off and operable to initiate a query. In some embodiments, the toggle switch is operable to turn the flashlight on when pressed once and operable to initiate a query when pressed twice.

In some embodiments of systems described herein wherein at least one query unit is a handheld device comprising a flashlight, the handheld device is operable to perform a query function and a flashlight function. In some embodiments, the query function and the flashlight function can be performed independently. In some embodiments, the handheld device is operable to simultaneously perform the query function and the flashlight function. In some embodiments, the handheld device is operable to perform the query function while not performing the flashlight function. In some embodiments, the handheld device is operable to perform the flashlight function while not performing the query function. In some embodiments, the handheld device is operable to perform neither the query function nor the flashlight function at a given time.

With reference to FIG. 14, a handheld device 1800, in some embodiments, comprises query portion 1801 and flashlight portion 1802. Query portion 1801, in some embodiments, comprises push button (triggering mechanism) 1811 operable to initiate a query, microprocessor 1820, query beam driver 1830, query beam source 1841 operable to emit query beam 1851, receiver 1860 comprising antenna 1861, amplifier 1870, response indicator (such as an LED) 1880, and batteries (power supply) 1891. In some embodiments, microprocessor 1820 comprises one or more of a query controller, a query beam modulator, and a response beam demodulator. Flashlight portion 1802, in some embodiments, comprises push button (switch) 1812 operable to turn on and off flashlight beam source 1842 operable to emit flashlight beam 1852, and batteries (power supply) 1892.

In some embodiments, one or more components shown in the embodiment of FIG. 14 can comprise various components described herein. In some embodiments, one or more components shown in the embodiment of FIG. 14 can have various features. For example, in some embodiments, the flashlight beam source comprises an incandescent bulb. In some embodiments, the flashlight beam source comprises a halogen bulb. In some embodiments, the flashlight beam source comprises an LED. In some embodiments, the flashlight beam source is operable to emit a flashlight beam having various characteristics. In some embodiments, for example, the flashlight beam comprises visible light. In some embodiments, the flashlight beam comprises near infrared or infrared light. In some embodiments, the flashlight beam has a high divergence. In some embodiments, the flashlight beam has a tunable divergence. It is understood that the present invention is not limited to the arrangement of components in the embodiment of FIG. 14. In some embodiments, for example, the query portion and the flashlight portion can be arranged differently.

In some embodiments of identification and communication systems described herein wherein at least one query unit is a handheld device, the handheld device comprises a stylus. In some embodiments, the stylus has a size and shape similar to a ball point pen. In some embodiments, the stylus comprises one or more components operable to perform a query function. In some embodiments, the stylus comprises a query beam source operable to emit a query beam. In some embodiments, the query beam source is operable to emit a query beam from a first end of the stylus. In some embodiments, the stylus comprises a triggering mechanism operable to initiate, continue, or end a query. In some embodiments, the triggering mechanism comprises a push button. In some embodiments, the triggering mechanism comprises a slide switch. In some embodiments, the triggering mechanism is operable to initiate a query of short duration, such as less than 1 second. In some embodiments, for example, the triggering mechanism comprises a push button operable to initiate a short query by being pressed once. In some embodiments, the triggering mechanism is operable to initiate a query of long duration, such as more than 1 second. In some embodiments, the triggering mechanism is operable to initiate a query of indefinite duration. In some embodiments, for example, the triggering mechanism comprises a push button operable to initiate a query of indefinite length by being pressed and held and operable to end the query by being released. In some embodiments, a triggering mechanism comprises a slide switch operable to initiate a query of indefinite length by being moved to an "on" position and operable to end the query by being moved to an "off" position. In some embodiments, the stylus is operable to scan a large area with a query beam. In some embodiments, the stylus is operable to scan a large area with a query beam by being moved during a long or indefinite query. In some embodiments, the stylus comprises a query beam source operable to emit a query beam having a large divergence, such as greater than 1 mrad, greater than 5 mrad, or greater than 10 mrad. In some embodiments, the stylus comprises a query beam source operable to emit a query beam having a divergence between about 10 mrad and about 500 mrad.

In some embodiments, the stylus comprises a connector operable to associate the stylus with another device or portion of a device. In some embodiments, the connector is operable to associate the stylus with a smart device. Any smart device not incompatible with the objectives of the invention may be used. In some embodiments, the connector is operable to associate the stylus with one or more of a smart phone, a personal digital assistant (PDA), a tablet personal computer (tablet PC), and an ultra-mobile PC (UMPC). In some embodiments, the connector comprises a serial communication connector. In some embodiments, the connector comprises a USB connector. In some embodiments, the connector comprises an IEEE 1394 connector. In some embodiments, the connector comprises a FireWire™ connector. In some embodiments, the connector comprises a wireless connector. In some embodiments, the connector comprises one or more of a Bluetooth™ connector, a wireless local area network (WLAN) connector, and a WiFi™ connector.

In some embodiments of identification and communication systems described herein wherein at least one query unit comprises a handheld device comprising a stylus, the handheld device comprises a smart device in communication with the stylus. The smart device can be in communication with the stylus in any manner not incompatible with the objectives of the present invention. In some embodiments, the smart device is in communication with the stylus through one or more connectors described herein.

In some embodiments of systems described herein wherein at least one query unit is a handheld device comprising a stylus and a smart device in communication with the stylus, the smart device comprises one or more of a smart phone, PDA, tablet PC, and UMPC. In some embodiments, the smart device comprises a computer programmed to run an application or software program operable to receive data (or information) from the stylus. Any application or software program not inconsistent with the objectives of the present invention may be used. Suitable applications and software programs may, in some embodiments, be provided by methods known to one of ordinary skill in the art. In some embodiments, the stylus comprises a query controller and the data comprises data received from the query controller. In some embodiments, the data comprises data associated with one or more queries.

In some embodiments of systems described herein wherein at least one query unit is a handheld device, the handheld device comprises a display screen. In some embodiments, the display screen is a two-dimensional display screen. In some embodiments, the display screen is associated with a smart device. In some embodiments, the display screen is the display screen of a smart device. In some embodiments of systems described herein, the handheld device comprises a query controller and the display screen is operable to display data (information) provided by the query controller. The data provided by the query controller can, in some embodiments, comprise any data generated by an identification and communication system described herein. In some embodiments, for example, the data comprises data regarding one or more targets or response units. In some embodiments, the data comprises whether one or more targets are "friends." In some embodiments, the data comprises one or more of the identity of the user of one or more response units, the type of one or more response units (e.g., a response unit associated with a vehicle, a particular type of handheld weapon, a particular type or group of personnel (e.g., a SWAT team or an infantry company), or an object such as an explosive device or a box or crate of provisions or other payload), and the location of one or more response units (e.g., the GPS coordinates of one or more response units). In some embodiments, the data provided by the query controller comprises the location of one or more response units. In some embodiments, the data provided by the query controller comprises the location of a plurality of response units.

Figure 15:
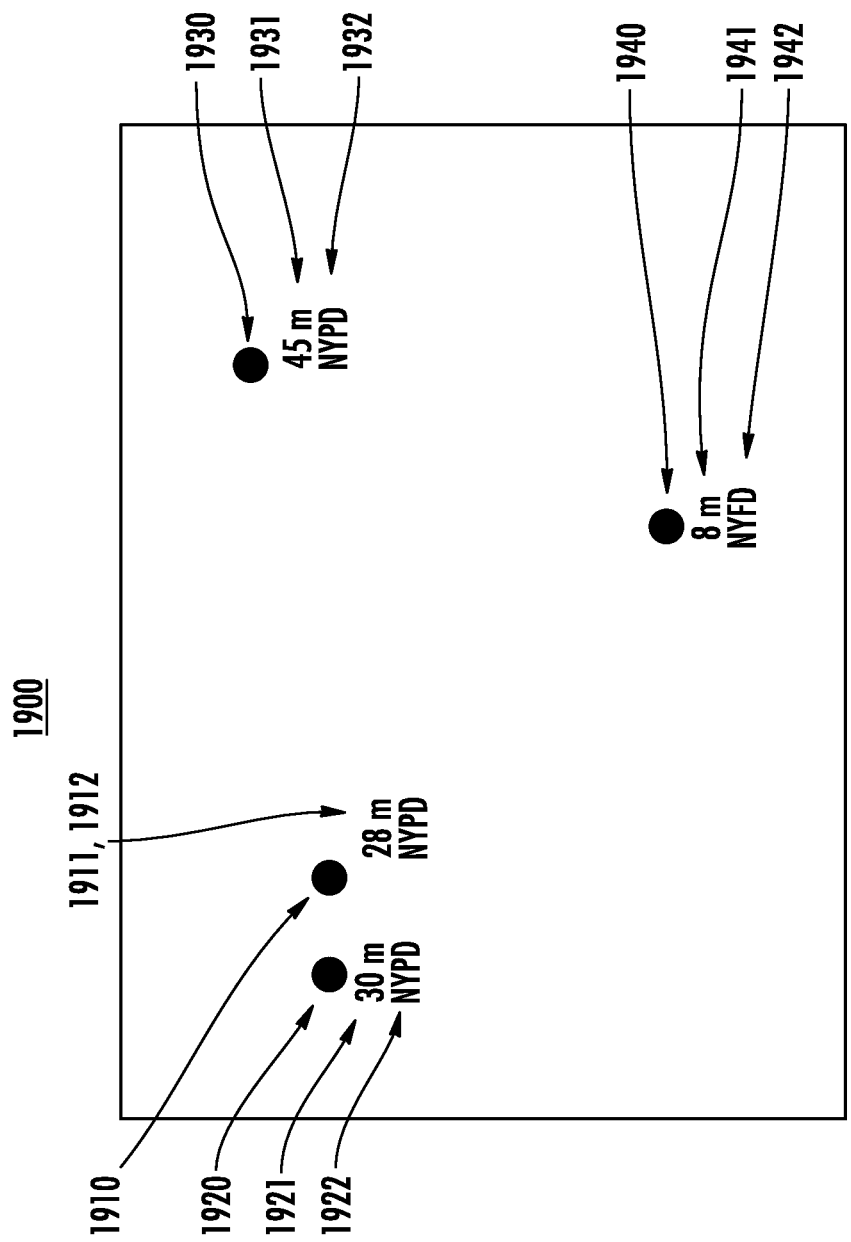
FIG. 15 illustrates a display screen of a handheld device according to some embodiments described herein.

As illustrated in FIG. 15, in some embodiments, the display screen can be operable to display data in various manners. With reference to FIG. 15, for example, in some embodiments display screen 1900 is operable to display the location of a plurality of targets 1910, 1920, 1930, and 1940 associated with a plurality of response units using icons. The locations, in some embodiments, can be relative locations (e.g., distances 1911, 1921, 1931, and 1941 relative to the query unit) or GPS locations. In some embodiments, display screen 1900 is operable to display additional information, such as the type of response unit 1912, 1922, 1932, and 1942 associated with each target (e.g., police department or fire department personnel). In some embodiments, the display screen is a touch screen. In some embodiments, the touch screen is operable to display additional data when a portion of the touch screen is touched or tapped. For example, in some embodiments, the touch screen is operable to display additional information about a target, such as 1910, when the icon for the target is touched. It is understood that some embodiments of systems described herein wherein at least one query unit is a handheld device comprising a display screen are not limited to the manner of display of the embodiment of FIG. 15.

E. Interoperable Systems

In some embodiments of identification and communication systems described herein, a system comprises one or more interoperable components, providing an interoperable system. In some embodiments, for example, a first interoperable identification and communication system comprises one or more components that can be used with one or more components of a second interoperable identification and communication system. In some embodiments, for example, a query unit of a first interoperable system can be used with a response unit of a second interoperable system. In some embodiments, a response unit of the first interoperable system can be used with a query unit of the second interoperable system. In some embodiments, a first interoperable identification and communication system comprises one or more first query units and one or more first response units, wherein at least one first query unit comprises at least one first query beam source operable to emit a first query beam that is a pulsed laser beam. In some embodiments, the pulsed laser beam comprises at least one pulse having a pulse length of about 10 µs per pulse to about 100 µs per pulse, about 50 µs per pulse to about 90 µs per pulse, or about 65 µs per pulse to about 75 µs per pulse. In some embodiments, the pulsed laser beam comprises at least one pulse having a pulse length of about 70 µs per pulse. In some embodiments, the pulsed laser beam comprises at least one pulse having a power of about 0.5 W per pulse to about 3.5 W per pulse, about 1.5 W per pulse to about 2.5 W per pulse, about 1.5 W per pulse to about 2.5 W per pulse, or about 1.8 W per pulse to about 2.2 W per pulse. In some embodiments, the pulsed laser beam comprises at least one pulse having a power of about 2.0 W per pulse. In some embodiments, the pulsed laser beam comprises a plurality of pulses described herein. In some embodiments, the pulsed laser beam is coded. In some embodiments, the coded pulsed laser beam conveys information based on the number and frequency of pulses.

In some embodiments, a first interoperable identification and communication system described herein comprises one or more first query units and one or more first response units, wherein at least one first query unit comprises at least one first query beam source operable to emit a first query beam having a diameter of about 20 inches to about 80 inches at about 100 m.

In some embodiments, a first interoperable identification and communication system described herein comprises one or more first query units and one or more first response units, wherein at least one first response unit comprises at least one detector having a detection surface area between about 0.05 in$^2$ and about 1.5 in$^2$ or between about 0.2 in$^2$ and about 0.8 in$^2$.

In some embodiments, a second interoperable identification and communication system comprises one or more second query units and one or more second response units, wherein at least one second query unit comprises at least one second query beam source operable to emit a second query beam that is a continuous wave (CW) laser beam. In some embodiments, the CW laser beam is coded. In some embodiments, the CW laser beam is pulse- and time-modulated. In some embodiments, the second query beam comprises at least one pulse having a pulse length of about 0.5 ms per pulse to about 1.5 ms per pulse or about 0.9 ms per pulse to about 1.1 ms per pulse. In some embodiments, the second query beam comprises at least one pulse having a pulse length of about 1.0 ms per pulse. In some embodiments, the second query beam comprises at least one pulse having a power of about 50 mW per pulse to about 150 mW per pulse or about 90 mW per pulse to about 110 mW per pulse. In some embodiments, the second query beam comprises at least one pulse having a power of about 100 mW per pulse. In some embodiments, the second query beam comprises a plurality of pulses described herein.

In some embodiments, a second interoperable identification and communication system described herein comprises one or more second query units and one or more second response units, wherein at least one second query unit comprises at least one second query beam source operable to emit a second query beam having a diameter of about 10 inches to about 100 inches at about 100 m.

In some embodiments, a second interoperable identification and communication system described herein comprises one or more second query units and one or more second response units, wherein at least one second response unit comprises at least one detector having a detection surface area between about 0.005 in$^2$ and about 0.15 in$^2$. In some embodiments, at least one detector has a detection surface area between about 0.02 in$^2$ and about 0.08 in$^2$.

In some embodiments, a first interoperable identification and communication system described herein does not comprise an identification and communication system of the present invention. In some embodiments, a second interoperable identification and communication system described herein does comprise an identification and communication system of the present invention. In some embodiments, a first and a second interoperable identification and communication system described herein are adapted to use the same coding and information processing scheme. In some embodiments, a plurality of interoperable identification and communication systems can be used together in various applications, such as military training and combat simulation.

Various features of various embodiments of identification and communication systems described herein can be combined in various ways. An identification and communication system described herein can comprise any combination of features not incompatible with the objectives of the present invention. For example, an identification and communication system described herein can comprise any query unit described herein in combination with any response unit described herein. Similarly, any query unit and any response unit described herein can be combined with any control unit or umpire unit described herein. And any query unit described herein can comprise any combination of components or features described herein (such as a specific query beam source described herein in combination with a specific handheld device described herein). Likewise, any response unit described herein can comprise any combination of components or features described herein (such as a specific detector described herein in combination with a specific response beam source described herein). Further, one or more components of any query unit or response unit described herein can be disposed in any manner described herein, for example in various housings described herein. Likewise, any identification and communication system described herein comprising any combination of elements and features described herein can be used in any method described herein not inconsistent with the objectives of the present invention.

II. Methods of Simulating Combat

A. Interoperable Combat Simulation

In another aspect, methods of simulating combat are described herein. In some embodiments, a method of simulating combat comprises emitting a query beam from a query unit described herein, receiving the query beam with a response unit described herein, emitting a response beam described herein from the response unit, and receiving the response beam with the query unit. In some embodiments, the query beam conveys information to the response unit. In some embodiments, the response beam conveys information to the query unit. In some embodiments, a method of simulating combat comprises providing a first interoperable identification and communication system and providing a second interoperable identification and communication system. In some embodiments, a method of simulating combat comprises emitting a query beam from a query unit of a first interoperable identification and communication system described herein and receiving the query beam with a response unit of a second interoperable identification and communication system described herein. In some embodiments, a method of simulating combat comprises emitting a query beam from a query unit of a second interoperable identification and communication system described herein and receiving the query beam with a response unit of a first interoperable identification and communication system described herein. In some embodiments, a method of simulating combat comprises emitting a first query beam from a first query unit of a first interoperable identification and communication system, receiving the first query beam with a second response unit of a second interoperable identification and communication system, emitting a second response beam with the second response unit, and receiving the second response beam with the first query unit. In some embodiments, the method further comprises emitting a second query beam from a second query unit of the second interoperable identification and communication system, receiving the second query beam with a first response unit of the first interoperable identification and communication system, emitting a first response beam with the first response unit, and receiving the first response beam with the second query unit. In some embodiments, the first query beam comprises a pulsed laser beam and the second query beam comprises a continuous wave (CW) laser beam. In some embodiments, the first query beam comprises at least one pulse and the second query beam comprises at least one pulse. In some embodiments, the first query beam comprises at least one pulse having a pulse length and a power per pulse whose product is within about 50% of the product of the pulse length and power per pulse of at least one pulse of the second query beam. In some embodiments, the first query beam comprises at least one pulse having a pulse length and a power per pulse whose product is within about 40% of the product of the pulse length and power per pulse of at least one pulse of the second query beam. In some embodiments, the first query beam comprises at least one pulse having a pulse length of about 65 µs per pulse to about 75 µs per pulse and a power of about 1.8 W per pulse to about 2.2 W per pulse and the second query beam comprises at least one pulse having a pulse length of about 0.9 ms per pulse to about 1.1 ms per pulse and a power of about 90 mW per pulse to about 110 mW per pulse. In some embodiments, the first query beam has a diameter at 100 m within about 80% of the diameter at 100 m of the second query beam. In some embodiments, the first query beam has a diameter at 100 m within about 50% of the diameter at 100 m of the second query beam.

B. Precise Combat Simulation

In another aspect, methods of simulating combat are described herein which, in some embodiments, provide precise marksmanship functionality. As illustrated in FIGS. 16-19, in some embodiments, a method of simulating combat comprises emitting a query beam comprising a plurality of packets each comprising a header portion, an information portion, and a footer portion from a query unit; and receiving the query beam with a response unit comprising a plurality of detectors spatially separated from one another, wherein the response unit is operable to independently measure the intensity of each packet of the query beam received at each of the plurality of detectors. In some embodiments, each information portion is the same, each header portion is different, and each footer portion is different. In some embodiments, each information portion comprises a coded signal described herein adapted to convey information described herein. For example, in some embodiments, each information portion comprises a coded signal adapted to convey information regarding the type of query unit. In some embodiments, each header portion comprises a coded signal described herein adapted to represent a unique number, different than the numbers represented by the other header portions. In some embodiments, each footer portion comprises a coded signal described herein adapted to represent a unique number, different than the numbers represented by the other footer portions and the header portions.

Figure 16:
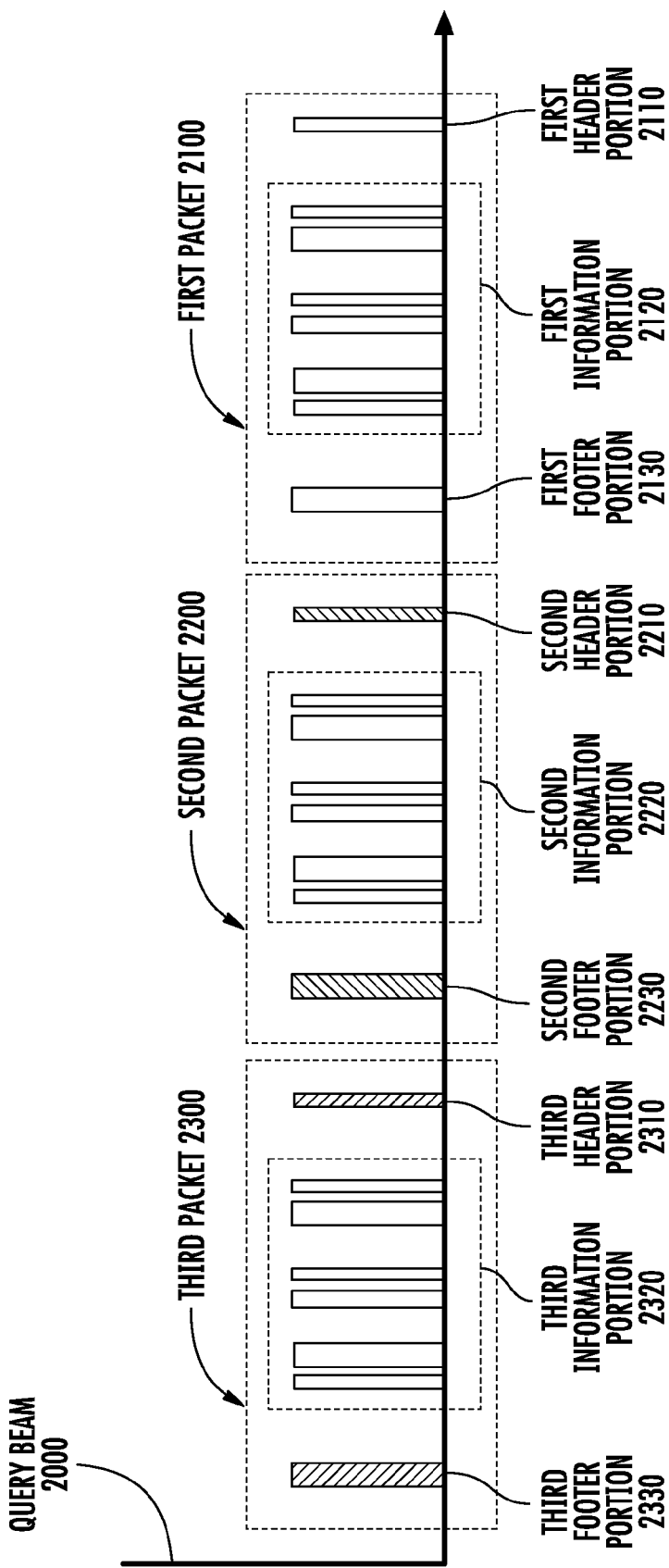
FIG. 16 illustrates some components of a query beam according to some embodiments described herein.

One embodiment of a query beam comprising a plurality of packets is illustrated in FIG. 16. With reference to FIG. 16, query beam 2000 comprises a first packet 2100, a second packet 2200, and a third packet 2300. First packet 2100 comprises first header portion 2110, first information portion 2120, and first footer portion 2130. Second packet 2200 comprises second header portion 2210, second information portion 2220, and second footer portion 2230. Third packet 2300 comprises third header portion 2310, third information portion 2320, and third footer portion 2330. In the embodiment of FIG. 16, each header portion 2110, 2210, and 2310 is coded to represent a different number. Similarly, each footer portion 2130, 2230, and 2330 is coded to represent a different number. But each information portion 2120, 2220, and 2320 is the same, coded to convey the same information. Although the query beam illustrated in FIG. 16 is shown with three packets, it is understood that methods described herein are not limited to using query beams with three packets. In some embodiments of methods of simulating combat described herein comprising a query beam comprising a plurality of packets, the query beam comprises at least three packets. In some embodiments, the query beam comprises at least five packets. In some embodiments, the query beam comprises between three packets and ten packets or between three packets and five packets. In some embodiments, the query beam comprises five packets.

Figure 17:
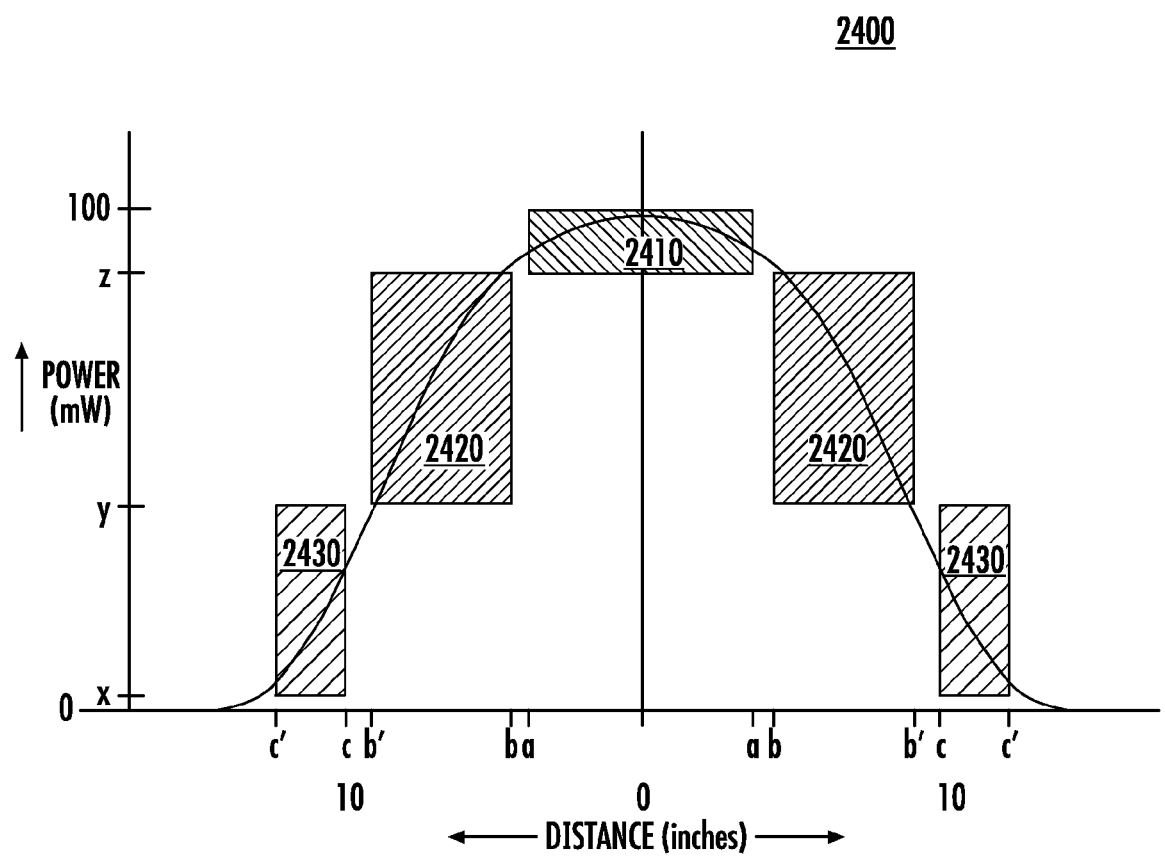
FIG. 17 illustrates a power distribution of a query beam according to some embodiments described herein.

In some embodiments, a method of simulating combat described herein further comprises measuring the intensity of each packet of the query beam received at each detector and processing the measured intensities. As illustrated in FIG. 17, in some embodiments, processing comprises binning (or categorizing) the measured intensities. In some embodiments, each measured intensity is binned (or categorized) into one of a plurality of bins (or categories). In some embodiments, each measured intensity is binned into one of three bins. In some embodiments, the three bins comprise a first level bin corresponding to high measured intensity, a second level bin corresponding to medium measured intensity, and a third level bin corresponding to low measured intensity. In some embodiments, each measured intensity is binned into one of four bins, the fourth level bin corresponding to zero measured intensity. In some embodiments, processing comprises correlating one or more bins to an approximate distance from the center of the query beam. In some embodiments, for example, measured intensities in the second level bin are correlated to a radial distance from the center of the beam of about 4 inches to about 8 inches.

One embodiment of a method of binning measured intensities is illustrated in FIG. 17. With reference to FIG. 17, a packet of a query beam can exhibit a radial power distribution 2400, where the y-axis shows the power (or intensity), and the x-axis shows the radial distance from the center of the beam. Measured intensities can be categorized in one of three bins 2410, 2420, and 2430. Measured intensities between "x" mW and "y" mW can be placed in third level bin 2430. Measured intensities between "y" mW and "z" mW can be placed in second level bin 2420. Measured intensities between "z" mW and 100 mW can be placed in first level bin 2410. In the embodiment of FIG. 17, 100 mW is the maximum power of the query beam, and "x," "y," and "z" are arbitrary intensities correlated with desired radial distances, based on the power profile of the query beam. For example, the query beam power profile illustrated in FIG. 17 can be binned in accordance with a model in which the query beam exhibits a power between "z" and 100 mW at a distance of 0 inches to "a" inches from the center of the query beam, a power between "y" mW and "z" mW at a distance of "b" inches to "b prime" inches from the center of the query beam, and a power between "x" mW and "y" mW at a distance of "c" inches to "c prime" inches from the center of the query beam. Thus, a measured intensity between "y" mW and "z" mW of a particular packet received at a particular detector could be interpreted to mean that the particular detector is located between "b" and "b prime" inches from the center of the query beam.

Figure 18:
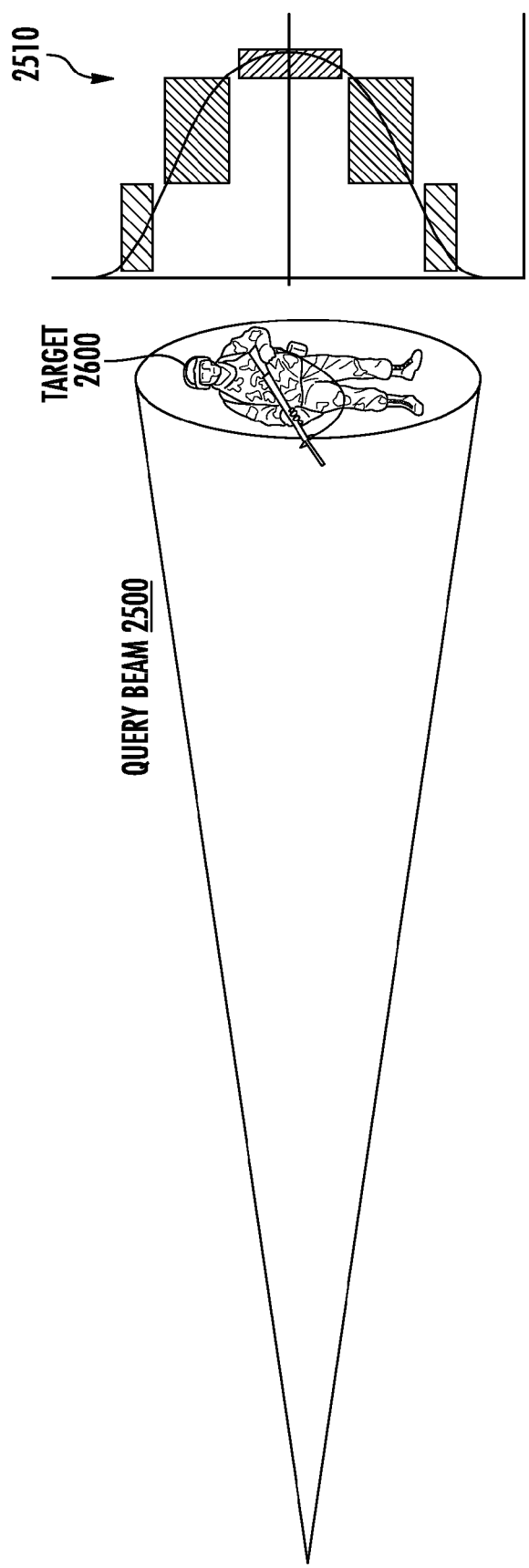
FIG. 18 illustrates some aspects of processing useful in some embodiments of methods of simulating combat described herein.

As illustrated in FIG. 18, in some embodiments of methods of simulating combat described herein, processing comprises comparing the measured intensities received at a plurality of detectors. In some embodiments, comparing comprises counting the number of measured intensities received at each detector placed into each bin. In some embodiments, comparing comprises identifying the measured intensity of each packet received at each detector, wherein each packet is distinguished based on its unique header portion and footer portion. With reference to FIG. 18, in one embodiment, a query beam 2500 having a radial power distribution 2510 and comprising five packets (not shown) is received by a response unit (not shown) comprising four detectors (not shown) spatially separated from one another on a target 2600. Each detector measures the intensity of each packet received at that detector, and the measured intensities are binned into three bins as shown in Table 1. Of the five packets received at the first detector, for example, three packets exhibit a measured intensity at the first detector falling into the first level bin, two packets exhibit a measured intensity at the first detector falling into the second level bin, and no packets exhibit a measured intensity at the first detector falling into the third level bin. Similarly, of the five packets received at the second detector, one packet exhibits a measured intensity at the second detector falling into the first level bin, one packet exhibits a measured intensity at the second detector falling into the second level bin, and three packets exhibit a measured intensity at the second detector falling into the third level bin. The comparison of binned measured intensities shown in Table 1 can be used, for example, to approximate the location of the center of the query beam in some embodiments.

Similarly, the comparison shown in Table 2 can be used to approximate the location of the center of the query beam in some embodiments. Table 2 illustrates the binned measured intensity of each packet received at each of four detectors. For example, the first packet exhibits a measured intensity falling into the first level bin at the first detector, the second level bin at the second detector, the second level bin at the third detector, and the third level bin at the fourth detector. But the second packet exhibits a different distribution of measured intensities. In some embodiments, variations in measured intensities at one or more detectors can be caused by movement of the query beam source during emission of the query beam. Such movement can be caused, for example, by recoil caused by the firing of a blank cartridge from a weapon equipped with the query unit. Therefore, in the embodiment of FIG. 18 and Tables 1 and 2, the distribution of measured intensities at the plurality of spatially separated detectors and the temporal evolution of that distribution (e.g., moving from the first packet to the second packet to the third packet to the fourth packet to the fifth packet) can be used, alone or in combination, to approximate the location of the center of the query beam at a given time.

TABLE 1

|  | First Level Bin Count | Second Level Bin Count | Third Level Bin Count |
| --- | --- | --- | --- |
| First Detector | 3 | 2 | 0 |
| Second Detector | 1 | 1 | 3 |
| Third Detector | 1 | 3 | 1 |
| Fourth Detector | 1 | 2 | 2 |

TABLE 2

| | Bin Levels. | | | |
| --- | --- | --- | --- | --- |
| | First Detector | Second Detector | Third Detector | Fourth Detector |
| First Packet | 1st | 2nd | 2nd | 3rd |
| Second Packet | 1st | 3rd | 2nd | 3rd |
| Third Packet | 1st | 3rd | 2nd | 2nd |
| Fourth Packet | 2nd | 1st | 3rd | 2nd |
| Fifth Packet | 2nd | 3rd | 1st | 1st |

Thus, in some embodiments of methods of simulating combat described herein, processing comprises calculating the location of the center of a query beam. In some embodiments, processing comprises calculating whether the center of the query beam struck a target associated with the response unit. In some embodiments, processing comprises calculating where on a target associated with the response unit the center of the query beam struck the target.

In some embodiments, comparing or processing comprises comparing or processing according to methods known in the art. In some embodiments, for example, comparing or processing comprises comparing or processing using one or more circuits, processors, or computers programmed to perform one or more functions, such as storing, counting, comparing, or correlating one or more numbers or signals. In some embodiments, a computer is programmed to calculate the location of the center of a query beam based on one or more inputs or algorithms stored in the computer. In some embodiments, for example, a computer is programmed to calculate the location of the center of a query beam based on one or more stored values corresponding to the number of detectors, the size of the detectors, the relative positions of the detectors, the measured intensities at the detectors, the shape of the query beam, the size (e.g., diameter) of the query beam, the power of the query beam, the power profile of the query beam (e.g., the power as a function of distance from the center of the beam), and the encoding of the query beam (e.g., the encoding corresponding to the header portions, information portions, and footer portions).

Figure 19:
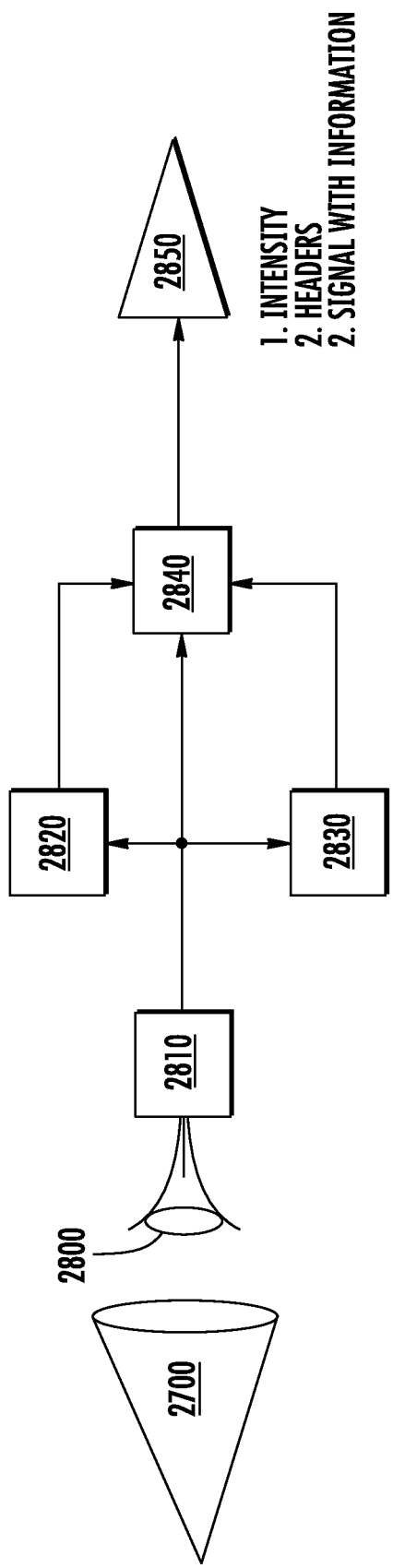
FIG. 19 illustrates some aspects of processing useful in some embodiments of methods of simulating combat described herein.

One manner of comparing and processing useful in some embodiments described herein is illustrated in FIG. 19. With reference to FIG. 19, query beam 2700 is received at detector 2800, which comprises amplifier 2810 operable to amplify received query beam 2700. The intensity of the received query beam 2700 or one or more portions thereof (e.g., first packet 2710, second packet 2720, etc., not shown), can be measured, binned and recorded, producing one or more binned measured intensities 2820. Similarly, the identity of one or more packets of query beam 2700 received at detector 2800 can be recorded, producing one or more received packet identifications 2830. Binned measured intensities 2820 and received packet identifications 2830 can then be compared, using a comparator 2840, producing a data signal 2850 for further processing.

In some embodiments of methods of simulating combat described herein, emitting the query beam comprises emitting a query beam from a light emitting diode. In some embodiments, the query beam is substantially collimated. In some embodiments, the query beam is a Gaussian beam. In some embodiments, the query beam is a substantially collimated Gaussian beam. In some embodiments, the query beam has a diameter between about 20 inches and about 100 inches at about 100 m. In some embodiments the query beam has a diameter between about 28 inches and about 36 inches at about 100 m or between about 30 inches and about 34 inches at about 100 m. In some embodiments, the query beam has a divergence of about 10 mrad to about 500 mrad. In some embodiments, the query beam comprises visible light. In some embodiments, the query beam comprises near infrared light or infrared light. In some embodiments, the query beam has a power between about 10 mW and about 2 W. In some embodiments, the query beam has a power between about 50 mW and about 150 mW or between about 80 mW and about 120 mW.

Some exemplary applications of some embodiments of systems described herein will now be described in the following specific examples.

EXAMPLE 1

Locating and Tracking Objects

Some embodiments of identification and communication systems described herein can be utilized in a variety of applications. For example, in some embodiments, an identification and communication system described herein can be utilized in combat and other military environments. Some embodiments suitable for use in combat environments can also be used in training environments. In some embodiments, an identification and communication system described herein can be used to identify friendly personnel and vehicles. In some embodiments, an identification and communication system described herein can be used to locate or track a particular object or item. In some embodiments, the object or item comprises pre-positioned or air-dropped provisions. In some embodiments, an object or item comprising provisions is equipped with a response unit described herein. For example, in some military operations, provisions such as equipment and/or supplies may be left in or dropped into an area, and personnel may be deployed into the area at a different location. The provisions can be equipped with a response unit. The personnel can be equipped with a query unit described herein and can operate the identification and communication system to query the location of the provisions and track their movement to that location. The query unit can be operated sequentially with a high beam divergence (also called "spread beam" operation) and then with a low beam divergence (also called "narrow beam" operation) to pinpoint the exact location of the provisions. The provisions can be equipped with a response unit comprising a response beam or signal source, such as a radio transmitter. In some embodiments, when the location of the provisions is reached by the query beam, the response unit can be adapted to return an identifying radio frequency signal. Therefore, in some embodiments, a method of locating an object comprises emitting a first query beam described herein having a first divergence, receiving a first response beam described herein from a response unit associated with the object in response to the first query beam, emitting a second query beam described herein having a second divergence, and receiving a second response beam described herein from the response unit in response to the second query beam, wherein the first query beam has a higher divergence than the second query beam.

EXAMPLE 2

Identifying, Locating, and Tracking Personnel

In some embodiments, an identification and communication system described herein can be used to identify, locate, and/or track individual personnel. In one personnel locating application, an identification and communication system described herein can be utilized by a leader to verify that personnel are in assigned positions. In another personnel locating application, an identification and communication system described herein can be utilized to search for disabled or lost personnel (for example, downed pilots) whose general area is known. In yet another personnel locating application, individual personnel air-dropped into an area can be located and identified by specific organization, at the squad level, for more efficient organization of airborne missions. Therefore, in some embodiments, a method of identifying and/or locating an individual person comprises emitting a query beam described herein associated with a query unit described herein and receiving a response beam described herein associated with a response unit described herein associated with the individual person in response to the query beam, wherein the response beam conveys information to the query unit regarding one or more of the location, identity, and type of the response unit. In some embodiments, a method of locating an individual person comprises emitting a first query beam described herein having a first divergence, receiving a first response beam described herein from a response unit described herein associated with the individual person in response to the first query beam, emitting a second query beam described herein having a second divergence, and receiving a second response beam described herein from the response unit in response to the second query beam, wherein the first query beam has a higher divergence than the second query beam.

EXAMPLE 3

Stealth Movement Markers

In some embodiments, an identification and communication system described herein can be used to indicate a march route. In some embodiments, the route can be indicated with stealth and security. In some embodiments, one or more response units described herein can be placed along a march route. In some embodiments, at least one component of at least one response unit can be hidden, for example, under leaves or dirt. Personnel or vehicles equipped with one or more query units described herein can, in some embodiments, track the march route by emitting one or more query beams described herein and receiving one or more response beams described herein. In some embodiments, a plurality of query beams can be emitted having differing beam divergences. Therefore, in some embodiments, a method of identifying a march route comprises emitting one or more query beams described herein associated with a query unit described herein and receiving one or more response beams described herein associated with one or more response units described herein placed along a march route, wherein at least one response beam conveys information to the query unit regarding one or more of the location, identity, and type of the response unit.

EXAMPLE 4

Passage of Lines

In some embodiments, an identification and communication system described herein can be used to verify the combat status of one or more combat, transportation, or supply lines. In various military or combat situations, a first force (such as an individual soldier or vehicle or a plurality of soldiers and vehicles, such as a platoon, company, battalion, or division) may pass through the lines of a second force. Either or both forces can be static or moving. An identification and communication system described herein, in some embodiments, can be used by one or more forces to identify another force. For example, an identification and communication system described herein, in some embodiments, can be used by one or more forces to verify that another force is friendly. Therefore, in some embodiments, a method of identifying a force comprises emitting one or more query beams described herein associated with a query unit described herein and receiving one or more response beams described herein associated with one or more response units described herein associated with the force, wherein at least one response beam conveys information to the query unit regarding one or more of the location, identity, and type of the response unit.

EXAMPLE 5

Querying Remote Response Units for Intelligence

In some embodiments, an identification and communication system described herein can be used to query one or more remote response units for information, such as situational or military intelligence. When the location of a response unit is known, it can be queried by emitting one or more query beams described herein associated with a query unit described herein toward the response unit. The query beam can comprise instructions to emit a response beam comprising desired information. If greater stealth is required, the response beam can comprise a highly directional, modulated laser beam. Therefore, in some embodiments, a method of obtaining information remotely comprises emitting one or more query beams described herein associated with a query unit described herein and receiving one or more response beams described herein associated with one or more response units described herein in response to at least one query beam, wherein at least one query beam comprises a request for information and at least one response beam conveys information to the query unit.

EXAMPLE 6

Detonating Land Mines or Other Explosives

In some embodiments, an identification and communication system described herein can be used to detonate land mines or other explosives remotely. In one detonation application, an identification and communication system described herein can be operable to carry out one-way communication. In some embodiments, for example, an identification and communication system comprises a query unit described herein and a response unit described herein, wherein the response unit is not operable to emit a response beam. In some embodiments, the response unit is adapted to detonate an explosive device when a query beam or signal described herein is received from a query unit described herein. In some embodiments, the response unit is located at or near the explosive device. Methods of detonating an explosive device described herein can, in some embodiments, exhibit various advantages over prior methods. In some embodiments, the query beam (also called the "triggering signal") comprises a modulated beam. Therefore, in some embodiments, a method of detonating an explosive device exhibits a reduced probability of a "false positive" signal and thus a false positive detonation. False positives can be caused in previous methods by sunlight or an incidental electromagnetic signal, such as a stray radio frequency signal. In some embodiments, a method of remotely detonating an explosive device comprises emitting a triggering signal that is undetectable by third parties. In some embodiments, a method of remotely detonating an explosive device comprises emitting a triggering signal that is unjammable by third parties. Therefore, in some embodiments, a method of detonating an explosive device remotely comprises emitting one or more query beams described herein associated with a query unit described herein and receiving at least one of the query beams with one or more response units described herein associated with the explosive device, wherein the at least one query beam comprises instructions to detonate the explosive device.

EXAMPLE 7

Vehicle Identification

In some embodiments, an identification and communication system described herein can be used to identify vehicles. In some embodiments, an identification and communication system described herein can provide unit identification for vehicles in a combat area of operation. In addition, in some embodiments, a system described herein can serve as a logistics mechanism to account for vehicles in motor pools and in transit. An identification and communication system described herein, in some embodiments, is operable to identify individual vehicles from a distance. Therefore, in some embodiments, a method of identifying a vehicle comprises emitting one or more query beams described herein associated with a query unit described herein toward a vehicle comprising one or more response units described herein and receiving one or more response beams described herein from the one or more response units in response to the one or more query beams.

EXAMPLE 8

Weapon Pairing for Replay

Some embodiments of identification and communication systems described herein are suitable for use in military training and simulation applications. In some embodiments, for example, an identification and communication system described herein can be used to record and/or replay interactions between one or more query units and one or more response units for training purposes. In some embodiments, for example, a query unit can be paired with a weapon carried by an individual soldier or other individual military unit. In some embodiments, a response unit can also be paired with an individual soldier or other individual military unit. In some embodiments, weapon activity and results can be recorded in a control unit described herein associated with an individual soldier or other individual military unit. In some embodiments, weapon activity and results can be recorded in an umpire unit described herein. As a result, some embodiments of systems described herein permit a training exercise to be conducted at locations other than at a training center.

EXAMPLE 9

Target Disable/Enable Function

Some embodiments of identification and communication systems described herein can be operable to perform other functions useful in some military training applications. In some embodiments, for example, an identification and communication system described herein is operable to perform a "target disable" function. For example, when a target comprising a response unit described herein receives a direct hit (or "kill" signal) from a query beam described herein associated with a query unit described herein (such as a query unit associated with a weapon), the query beam can trigger the disabling of one or more components associated with the target, such as a weapon. In a similar manner, in some embodiments, an umpire observing a training exercise can send a signal having the "disable" code to one or more components of a participating unit described herein that is deemed to be violating the rules of engagement or should otherwise be stopped from continued participation. In some embodiments, an identification and communication system described herein is operable to perform a "target enable" function. In some embodiments, a "target enable" function is performed when a signal having the "enable" code is sent to a target (e.g., a participating unit) to re-enable the target's weapon and thereby allow further participation in the training exercise.

EXAMPLE 10

First Responder Safety and Search

Some embodiments of identification and communication systems described herein can be used in various non-military applications, such as civilian commercial or personal applications. In some embodiments, for example, an identification and communication system described herein can be utilized by law enforcement and/or other first responders to query whether another person at a location is a friendly person. In some embodiments, a law enforcement officer or other first responder in a particular area can send a query beam described herein to another law enforcement officer or first responder equipped with a response unit described herein. By identifying friendly personnel, use of an identification and communication system described herein can reduce injury to law enforcement and other first responder personnel and minimize or eliminate fratricide. In addition, when such personnel are disabled or lost, an identification and communication system described herein can be used to help locate those personnel. Therefore, in some embodiments, a method of identifying a person comprises emitting one or more query beams described herein associated with a query unit described herein toward a person equipped with one or more response units described herein and receiving one or more response beams described herein from the one or more response units in response to the one or more query beams, wherein the one or more response beams convey identification information.

EXAMPLE 11

Vehicle Identification

In some embodiments, an identification and communication system described herein can be used to identify vehicles. In some embodiments, a system described herein can serve as a logistics mechanism to account for vehicles in motor pools and in transit. In addition to logistical accounting, a system described herein, in some embodiments, can provide other functions, such as tracking location and movement of working vehicles. For example, trucks hauling mining products in a localized area can be tracked, which can lead to greater efficiency of fleet movement. A system described herein can also be utilized to locate a stolen vehicle equipped with a response unit described herein. Therefore, in some embodiments, a method of identifying a vehicle comprises emitting one or more query beams described herein associated with a query unit described herein toward a vehicle comprising one or more response units described herein and receiving one or more response beams described herein from the one or more response units in response to the one or more query beams, wherein the one or more response beams convey identification information.

EXAMPLE 12

Explosives Detonation

In some embodiments, an identification and communication system described herein can be used to improve the safety of explosives detonation, for example, at a construction site. Conventional detonators are often radio-based, and are susceptible to inadvertent detonation by "false positive" signals such as from sunlight or by a random radio frequency signal. In some embodiments, a query beam described herein can serve as a highly directional and coded triggering signal, coded such that only the particular code can detonate the explosive. Therefore, detonation of explosives utilizing a system as described herein can be safer than conventional detonation systems. Therefore, in some embodiments, a method of detonating an explosive comprises emitting one or more query beams described herein associated with a query unit described herein and receiving at least one query beam with a response unit described herein associated with the explosive, wherein the at least one query beam comprises instructions to detonate the explosive.

EXAMPLE 13

Hunting Safety

In some embodiments, an identification and communication system described herein can be used by hunters to improve hunting safety. In some hunting situations, hunters may be required to use a weapon equipped with a query unit described herein and to wear a response unit described herein. Each hunter would thus be able to identify another hunter hidden from direct view as a non-hunting target and avoid firing at the other hunter. In this way, an identification and communication system described herein, in some embodiments, can help prevent accidental shootings. In addition to hunters wearing response units described herein, others living near a hunting area can wear a response unit described herein so that hunters may identify those persons as non-hunting targets before firing their weapon at those persons. In such a hunting safety application, in some embodiments, the query beam may not be coded or encrypted as in some other applications. Therefore, in some embodiments, a method of verifying a hunting target comprises emitting one or more query beams described herein associated with a query unit described herein and receiving at least one response beam associated with a response unit described herein in response to at least one query beam.

That which is claimed is:

1. An identification and communication system comprising:
   one or more query units;
   one or more response units, wherein the one or more response units comprises a detector; and
   a beam splitter, wherein the beam splitter comprises at least one of two prisms joined at the base, a half-silvered mirror, and a dichroic prism;
   wherein at least one query unit comprises a first query beam source operable to emit a first component beam and a second query beam source operable to emit a second component beam;
   wherein the first query beam source comprises a light emitting diode and the second query beam source comprises a laser;
   wherein the first component beam is substantially collimated and the second component beam is substantially collimated;
   wherein the first component beam has a higher divergence and a larger diameter than the second component beam;
   wherein the first component beam and the second component beam are substantially concentric;
   wherein the beam splitter is disposed in the path of both the first component beam and the second component beam and is adapted to direct a first portion of the first component beam in substantially the same direction as a first portion of the second component beam;
   wherein the first portion of the first component beam has a higher divergence and a larger diameter than the first portion of the second component beam;
   wherein the first portion of the first component beam and the first portion of the second component beam are substantially concentric;
   wherein the first component beam and the second component beam comprise electromagnetic radiation of differing wavelengths; and
   wherein the first portion of the first component beam and the first portion of the second component beam comprise electromagnetic radiation of differing wavelengths.

2. The system of claim 1, wherein the detector comprises an application specific integrated circuit (ASIC) comprising an amplifier operable to amplify the first component beam and/or the second component beam.

3. The system of claim 1, wherein the first component beam and/or the second component beam is coded.

4. The system of claim 1, wherein the first component beam and/or the second component beam comprises infrared light.

5. The system of claim 1, wherein the first component beam and/or the second component beam has a power between about 50 mW and about 150 mW.

6. The system of claim 1, wherein the light emitting diode has a diameter of about 5 mm or less.

7. The system of claim 1, wherein the one or more response units comprises one or more detectors comprising one or more optical fibers operable to direct one or more signals received from at least one query unit to the one or more detectors.

* * * * *